(12) United States Patent
Nishikawa et al.

(10) Patent No.: US 11,163,043 B2
(45) Date of Patent: Nov. 2, 2021

(54) DISTANCE MEASURING DEVICE AND DISTANCE IMAGE SYNTHESIZING METHOD

(71) Applicant: Panasonic Intellectual Property Management Co., Ltd., Osaka (JP)

(72) Inventors: Mayu Nishikawa, Osaka (JP); Keiichi Mori, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 960 days.

(21) Appl. No.: 15/852,352

(22) Filed: Dec. 22, 2017

(65) Prior Publication Data

US 2018/0120423 A1  May 3, 2018

Related U.S. Application Data

(63) Continuation of application No. PCT/JP2016/003132, filed on Jun. 30, 2016.

(30) Foreign Application Priority Data

Jul. 3, 2015  (JP) .............................. JP2015-134677

(51) Int. Cl.
*G01C 3/08* (2006.01)
*G01S 7/4865* (2020.01)
(Continued)

(52) U.S. Cl.
CPC .............. *G01S 7/4865* (2013.01); *G01C 3/08* (2013.01); *G01S 7/4863* (2013.01); *G01S 17/08* (2013.01); *G01S 17/10* (2013.01); *G01S 17/89* (2013.01)

(58) Field of Classification Search
CPC ........ G01S 7/4865; G01S 17/89; G01S 17/10; G01S 7/4863; G01S 17/08; G01C 3/08
See application file for complete search history.

(56) References Cited

U.S. PATENT DOCUMENTS

2006/0274302 A1\* 12/2006 Shylanski ............... G06T 7/593
356/139.09
2011/0164132 A1  7/2011 Buettgen et al.
(Continued)

FOREIGN PATENT DOCUMENTS

JP    2006-253876 A    9/2006
JP    2011-146767 A    7/2011
(Continued)

OTHER PUBLICATIONS

International Search Report issued in Application No. PCT/JP2016/003132 dated Aug. 23, 2016, with English translation.
(Continued)

*Primary Examiner* — Samantha K Nickerson
(74) *Attorney, Agent, or Firm* — McDermott Will & Emery LLP

(57) ABSTRACT

A distance measuring device includes: a light emitter which emits light from a light source to a target object; a light receiver which receives reflected light in a group of pixels two-dimensionally disposed, the reflection light being generated through reflection of the light emitted from the light emitter on the target object; a synthesizer which generates a synthesized signal by synthesizing pixel signals read from pixels exposed at different exposure intervals to generate a synthesized signal; and a distance arithmetic operator which calculates a value of distance to the target object based on the synthesized signal and the difference in time between emission and reception of the light. The synthesizer generates the synthesized signal by the first synthesis processing when a pixel signal of a pixel exposed at a first exposure interval has a signal level higher than a predetermined saturation level, and generates the synthesized signal by second synthesis processing the pixel signal of the pixel
(Continued)

exposed at the first exposure interval has a signal level lower than the predetermined saturation level.

13 Claims, 19 Drawing Sheets

(51) Int. Cl.
*G01S 17/89* (2020.01)
*G01S 17/10* (2020.01)
*G01S 7/4863* (2020.01)
*G01S 17/08* (2006.01)

(56) References Cited

U.S. PATENT DOCUMENTS

| | | | | |
|---|---|---|---|---|
| 2013/0057743 A1* | 3/2013 | Minagawa | | H04N 5/374 348/302 |
| 2013/0206740 A1* | 8/2013 | Pfeifer | | B23K 9/0953 219/124.5 |
| 2015/0312464 A1* | 10/2015 | Peng | | H04N 5/3532 348/226.1 |
| 2016/0178734 A1 | 6/2016 | Kawamura et al. | | |

FOREIGN PATENT DOCUMENTS

| | | |
|---|---|---|
| JP | 2012-225807 A | 11/2012 |
| JP | 2013-516913 A | 5/2013 |
| WO | 2014/207983 A1 | 12/2014 |

OTHER PUBLICATIONS

Office Action issued in Japanese Patent Application No. 2017-527072, dated Apr. 28, 2020.

* cited by examiner

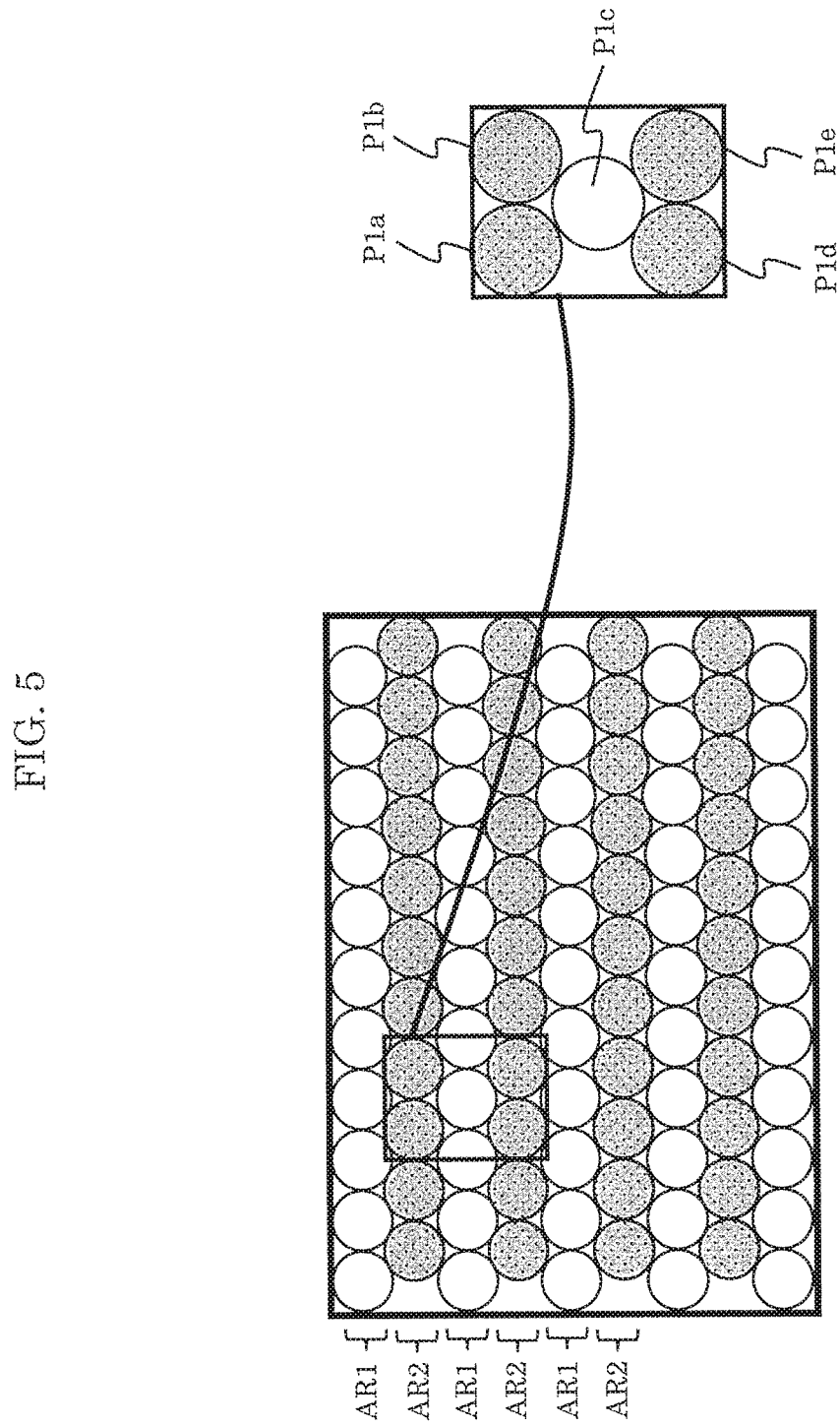

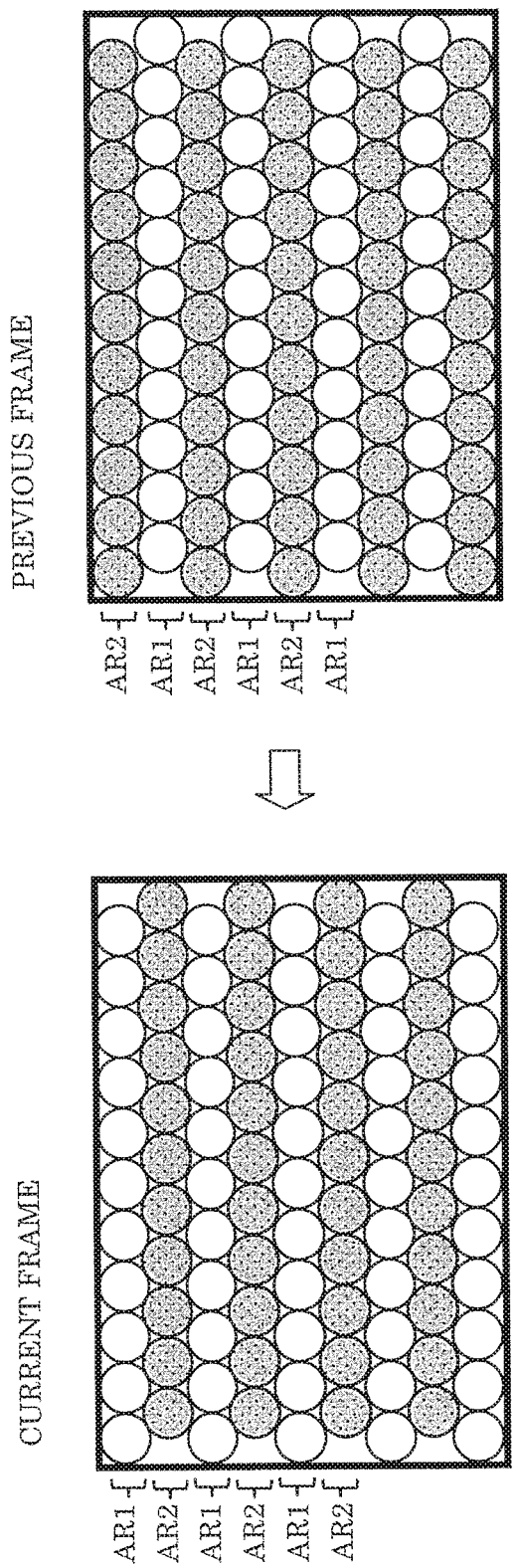

DISTANCE MEASURING DEVICE AND DISTANCE IMAGE SYNTHESIZING METHOD

CROSS REFERENCE TO RELATED APPLICATIONS

This application is a U.S. continuation application of PCT International Patent Application Number PCT/JP2016/003132 filed on Jun. 30, 2016, claiming the benefit of priority of Japanese Patent Application Number 2015-134677 filed on Jul. 3, 2015, the entire contents of which are hereby incorporated by reference.

BACKGROUND

1. Technical Field

The present disclosure relates to distance image synthesizing methods, and particularly relates to a distance image synthesizing method in a distance measuring device measuring a distance with a light source and a solid-state imaging element using delay of light.

2. Description of the Related Art

Devices and methods of generating images including information of a measured distance to a target object (hereinafter, referred to as distance image) have been used in the fields of games and amusements. In recent years, attention has been paid to such devices and methods in applications to and technical development to many other fields, such as medical care and advertisement, as a result of a reduction in size of the devices and an increase in availability of such products for general consumers.

Several methods of measuring the distance of a target object for generating a distance image are known: for example, a method of generating a distance image based on the parallax in images taken by a plurality of cameras, and a method of irradiating a target object with a known random dot pattern, and generating a distance image based on the distortion of the dot pattern. Examples thereof include a Time of Flight (TOF) method of irradiating a target object with infrared light or laser light, and calculating (measuring) the distance to the target object based on a measured time taken from arrival of the light at the target object to reflection and reception of the light.

Obviously, high precision in the measurement of the distance of the target object increases the freedom of control. The TOF method uses the signal amount obtained through exposure to the light reflected from the target object in a solid-state imaging element. For this reason, an improvement in precision in the measurement of the distance accompanied by prevention of a saturated signal of the received light or a reduced S/N ratio, and thus generation of a distance image with high precision can be expected through appropriate exposure adjustment of the reflected light to be received according to the distance from the solid-state imaging element to the target object and the surface reflectance of the target object.

Unfortunately, the intensity of the reflected light to be received significantly varies depending on the distance to the target object or its surface reflectance; hence, the measurement of the distance cannot always have high precision across the entire distance image whatever exposure setting is determined.

For example, when the exposure amount is increased through adjustment of the exposure of the reflected light, strong light is reflected from an object in a short distance or an object having high surface reflectance, facilitating the saturation of the signal. Conversely, when the exposure amount is decreased, weak light is reflected from an object in a long distance or an object having low surface reflectance becomes weak, reducing the S/N ratio. Both cases reduce the precision in the measurement of the distance.

The light decays inversely proportionally to the square of the distance from a light source. In outdoor measurement of the distance, for example, in front of a vehicle, the target object includes roads, walkers, preceding vehicles, and oncoming vehicles, and the distances to these targets vary from several meters up to infinity. Accordingly, it is believed that the target object in a short distance has an optimal exposure setting different from that of the target object in a long distance.

In Japanese Unexamined Patent Application Publication No. 2012-225807, several distance images having different exposures are taken, and the weighted average of distance information is calculated for corresponding pixels from the distance images to generate a synthesized distance image having high precision in the measurement of the distance.

In Japanese Unexamined Patent Application Publication No. 2006-253876, in a solid-state imaging element, the signal charge accumulation time is individually set in even pixel lines and odd pixel lines to take out signals having different sensitivities, and the signals having different sensitivities are synthesized in a signal processing system in a rear stage. Specifically, for example, a longer signal charge accumulation time is set in the pixels in even lines to obtain pixel signals having high sensitivity whereas a shorter signal charge accumulation time is set in the pixels in odd lines to obtain pixel signals having low sensitivity. In synthesis processing, in general, pixel signals having high sensitivity are selected for the pixels having unsaturated pixel signals from the even lines (pixel signals having high sensitivity) and are used; pixel signals in near odd lines (pixel signals having low sensitivity) are selected for the pixels having saturated pixel signals.

SUMMARY

Unfortunately, the distance measuring device according to Japanese Unexamined Patent Application Publication No. 2012-225807 includes a frame memory to store several distance images having different exposures. An enhancement in resolution of the distance image using such a configuration increases the size and cost of the distance measuring device. In addition to this problem, because the synthesis processing is performed after the generation of the distance image, the intensity of the reflected light is varied according to the reflectance of the target object even in the measurement of the distance of the target object in the same distance. Accordingly, it is desired that the synthesis processing be performed on the pixel signals before the generation of the distance image rather than on the distance image.

In the synthesis processing described in Japanese Unexamined Patent Application Publication No. 2006-253876, only pixel signals having high sensitivity are used when the pixel signals having high sensitivity are not saturated. For this reason, the pixel information of pixel signals having low sensitivity, even if effective, is not used.

In consideration of these problems in the related art, an object of the present disclosure is to provide a distance measuring device and a distance image synthesizing method which use all the effective pixel information, and can have high precision in measurement of a distance substantially across the entire distance image irrespective of a distance to at least one object present within a target imaging space and the surface reflectance of the object.

To achieve this object, the distance measuring device according to the present disclosure includes: a light emitter which emits light from a light source to a target object; a light receiver which receives reflected light in a group of pixels two-dimensionally disposed, the reflected light being generated through reflection of the light emitted from the light emitter on the target object; a synthesizer which generates a synthesized signal by synthesizing a plurality of pixel signals read from pixels exposed at different exposure intervals among the group of pixels; and a distance arithmetic operator which calculates a value of distance to the target object based on the synthesized signal and a difference in time between emission and reception of the light. The synthesizer generates the synthesized signal by first synthesis processing when a pixel signal of a pixel exposed at a first exposure interval has a signal level higher than a predetermined saturation level, and generates the synthesized signal by second synthesis processing when the pixel signal of the pixel exposed at the first exposure interval has a signal level lower than the predetermined saturation level.

The present disclosure enables synthesis processing according to the signal level of the pixel signal, and can treat with a change in intensity of the reflected light caused by the reflectance of the target object. Furthermore, because all the effective pixel information is used, the sensitivity of the pixel signal before synthesis can also be increased even if the pixel signal having high sensitivity is not saturated.

The distance measuring device according to the present disclosure uses all the effective pixel information, and can have high precision in the measurement of the distance across the substantially entire distance image irrespective of a distance to at least one object present within a target imaging space and the surface reflectance of the object.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a diagram illustrating an example of a pixel arrangement and divided regions in a solid-state imaging element;

FIG. 9 is a diagram illustrating an example of a pixel arrangement and divided regions in the solid-state imaging element according to Embodiment 2;

DETAILED DESCRIPTION OF THE EMBODIMENTS

Embodiments will now be described in detail with reference to the drawings.

Embodiment 1

Although the distance image can be generated by any technique, the following embodiment will be described by way of an example using a Time of Flight (TOF) method of measuring a distance to a target object by irradiating the target object with infrared light or laser light to determine the round-trip time of the light.

Figure 1:
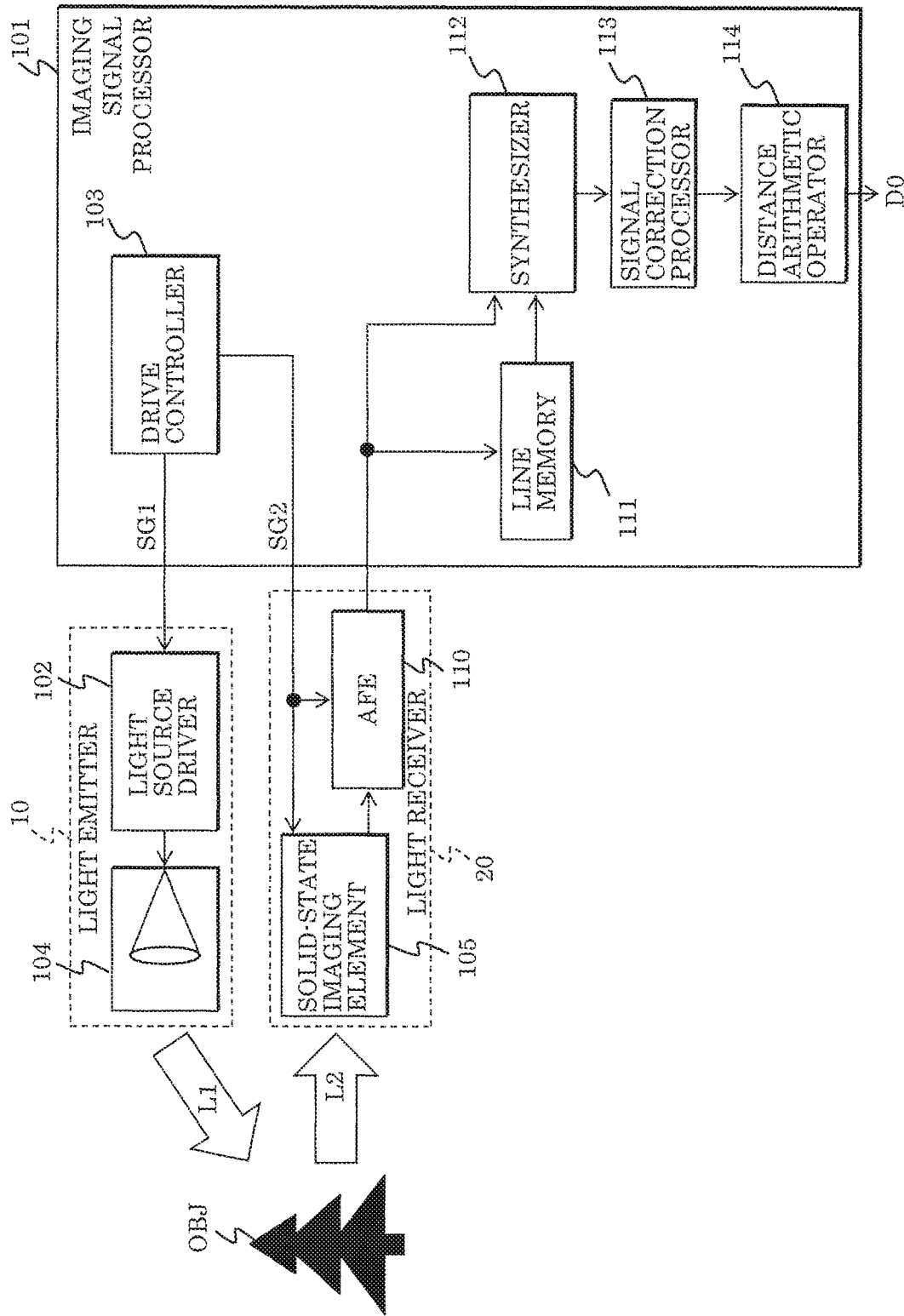
FIG. 1 is a diagram illustrating an exemplary configuration of the distance measuring device according to Embodiment 1.

FIG. 1 is a block diagram illustrating a configuration of the distance measuring device according to Embodiment 1. The distance measuring device illustrated in FIG. 1 includes imaging signal processor 101, light emitter 10, and light receiver 20. Imaging signal processor 101 includes drive controller 103, line memory 111, synthesizer 112, signal correction processor 113, and distance arithmetic operator 114. Light emitter 10 includes light source driver 102 and light source 104. Light receiver 20 includes solid-state imaging element 105 and analog front end (AFE) 110.

Examples of the light emitted from light source 104 include infrared light and laser.

Examples of solid-state imaging element 105 include charge coupled device (CCD) and complementary metal-oxide semiconductor (CMOS) sensors.

Drive controller 103 generates light emission timing signal SG1 and its corresponding exposure timing signal SG2 according to a predetermined condition. Light source driver 102 is controlled by light emission timing signal SG1, and light source 104 emits light L1 to target object OBJ. Emitted light L1 has a pulse waveform with a predetermined emission width.

Emitted light L1 is reflected by target object OBJ, and reflected light L2 is received by solid-state imaging element 105. Solid-state imaging element 105 has a group of pixels two-dimensionally disposed. Solid-state imaging element 105 performs exposure according to exposure timing signal SG2, and outputs the charges accumulated in the group of pixels to AFE 110 as signals. The charge signals input into AFE 110 are analog-to-digital converted. The digital data after the conversion is input into imaging signal processor 101.

Figure 3:
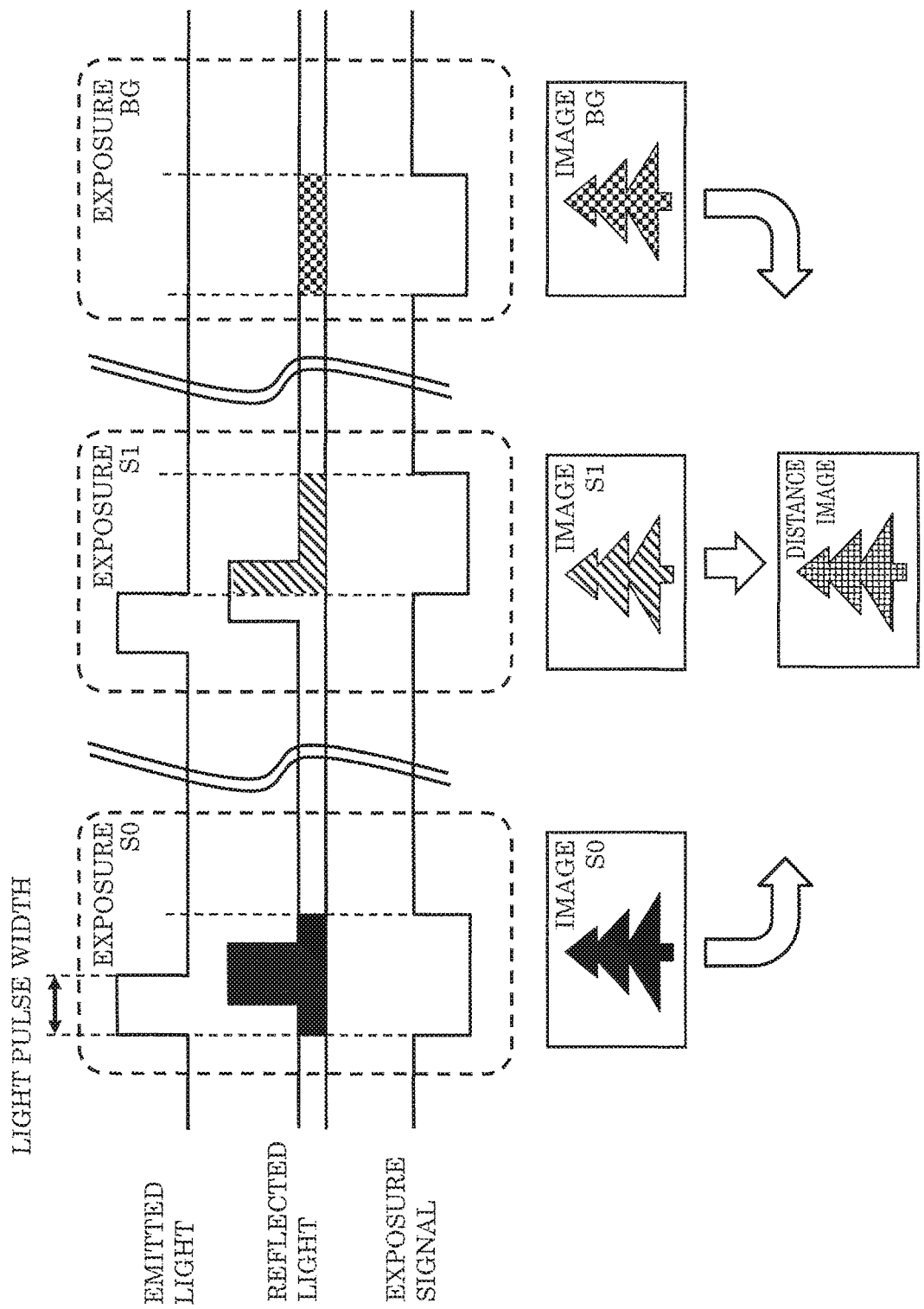
FIG. 3 is a diagram illustrating an exemplary TOF method of measuring a distance.

One example of the TOF method of measuring a distance will now be described with reference to FIG. 3. The TOF method performs exposure S0 where all of the reflected components of the light emitted from the light source are received, exposure S1 where part of the reflected components of the light emitted from the light source is received, and exposure BG where only background light is received without emission of the light from the light source. The charge is accumulated through repetition of each of these three exposure operations once or several times, and the accumulated charge amount is converted into digital data (S0, S1, or BG). The values of expressions (S0−BG) and (S1−BG) are calculated. From the ratio of the values, the distance is calculated. Distance L is expressed by Expression 1 where the light pulse width (irradiation time) is T0, and the light speed is c:

$$L = \frac{c \times T_0}{2} \times \frac{S1 - BG}{S0 - BG} \quad \text{[Expression 1]}$$

Figure 4A:
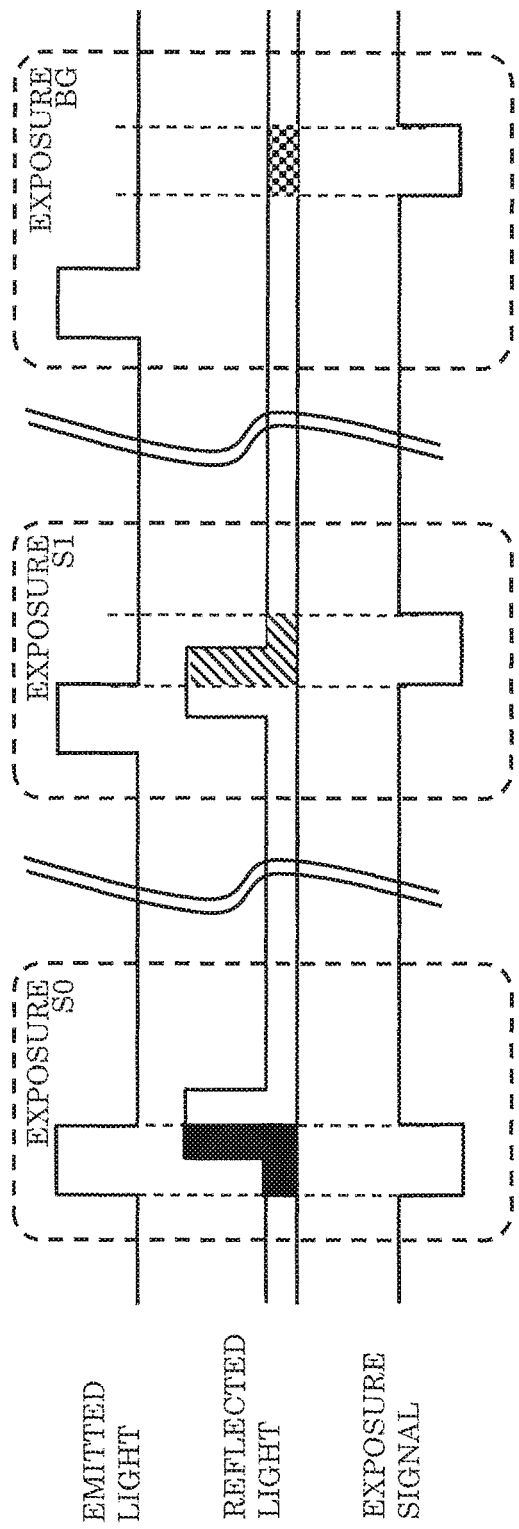
FIG. 4A is a diagram illustrating an exemplary TOF method of measuring a distance.
Figure 4B:
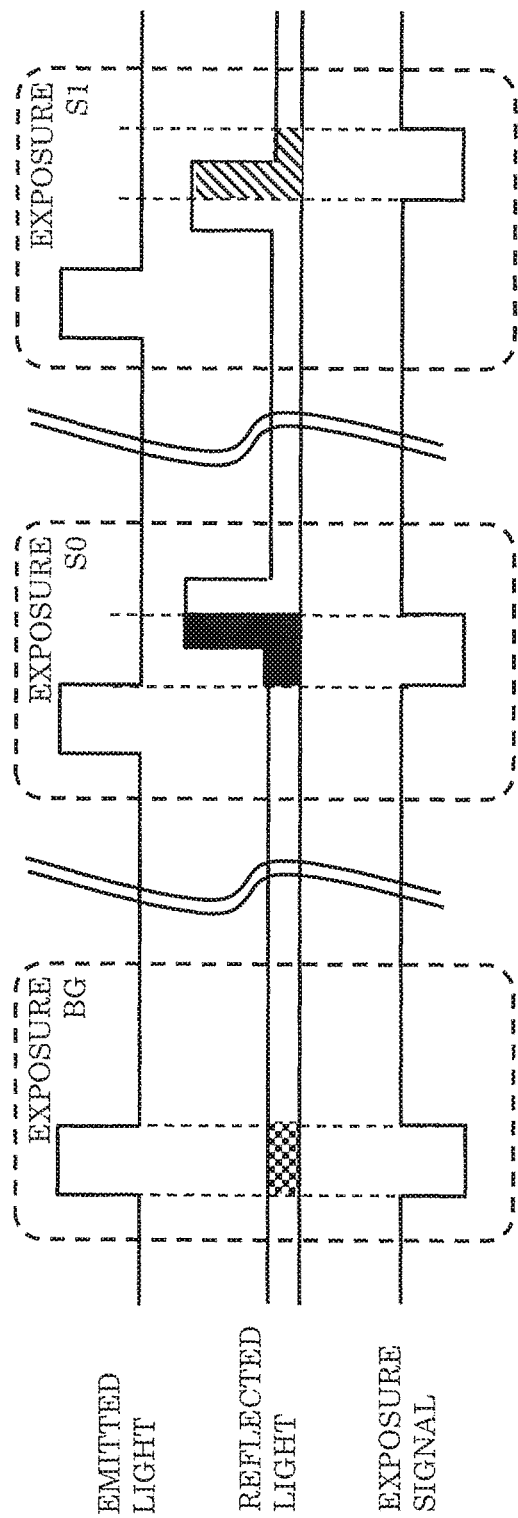
FIG. 4B is a diagram illustrating another example of a TOF method of measuring a distance.

FIGS. 4A and 4B illustrate other examples of the TOF method of measuring a distance. In FIGS. 4A and 4B, the exposure signal has a half of the width of the exposure signal in FIG. 3, and the light source emits light also in exposure BG. In this case, distance L is calculated from Expression 2:

$$L = \frac{c \times T_0}{2} \times \frac{S1 - BG}{(S0 - BG) + (S1 - BG)} \quad \text{[Expression 2]}$$

Light reception signals are treated in the order of exposure S0, exposure S1, and exposure BG as illustrated in FIG. 4A in a pixel having a short distance to the target object, and are treated in the order of exposure BG, exposure S0, and exposure S1 as illustrated in FIG. 4B in a pixel having a long distance to the target object. Such processing enables a measurable distance range to be doubled.

Any other timing of the exposure signal and any other expression for calculating the distance can be used without limitation.

The digital data (S0, S1, and BG) input into imaging signal processor 101 is held in line memory 111 in units of lines of the pixels included in solid-state imaging element 105. Synthesizer 112 performs synthesis processing using the output from AFE 110 and the output from line memory 111. The result of the synthesis processing performed in synthesizer 112 is input into signal correction processor 113. Signal correction processor 113 performs processings, such as level correction and noise reduction. Distance arithmetic operator 114 performs calculation of Expression (1) using the data output from signal correction processor 113, and outputs value of distance D0.

In the present embodiment, the pixels of solid-state imaging element 105, in units of lines, are divided into several regions. Solid-state imaging element 105 selectively performs exposure of each region according to exposure timing signal SG2. Drive controller 103 can generate light emission timing signal SG1 and exposure timing signal SG2 for each of the several regions in solid-state imaging element 105 according to different conditions on measurement.

FIG. 5 illustrates one example of a pixel arrangement and divided regions in solid-state imaging element 105. In FIG. 5, the group of pixels of solid-state imaging element 105 is divided into two regions AR1 and AR2. First region AR1 is disposed in odd lines, and second region AR2 is disposed in even lines. The pixels in the odd lines are disposed so as to be shifted from those in the even lines in the horizontal direction by a half of a pixel. The group of pixels can be divided into any number of regions having any size other than those illustrated in FIG. 5.

Figure 6A:
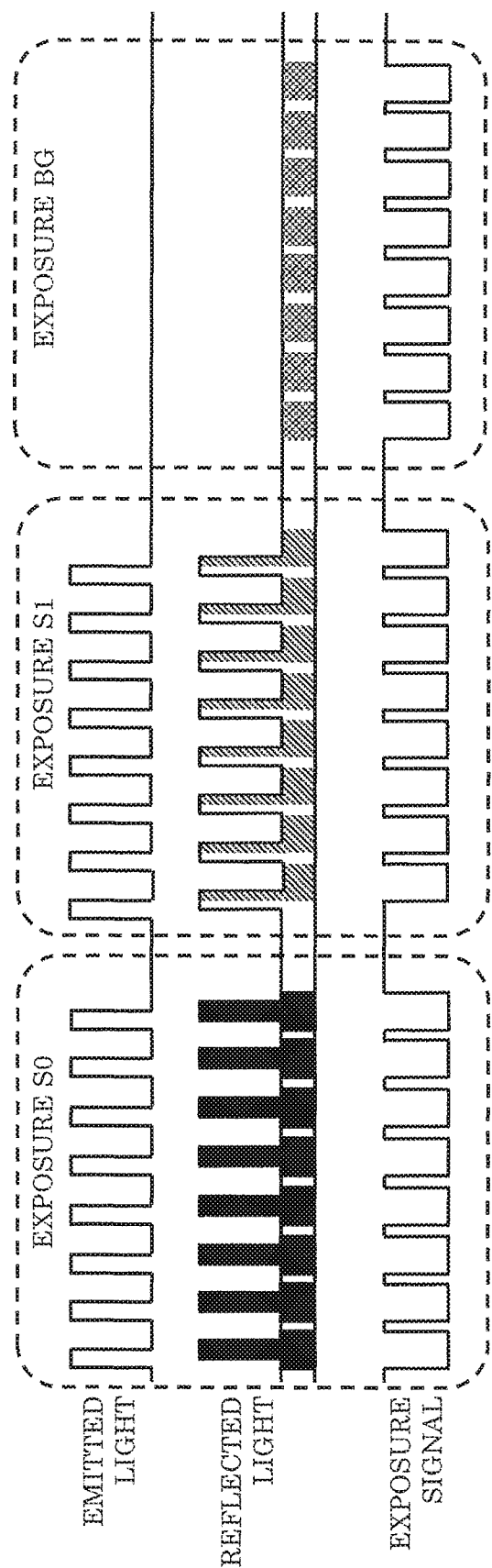
FIG. 6A is a diagram illustrating an exemplary condition on measurement.
Figure 6B:
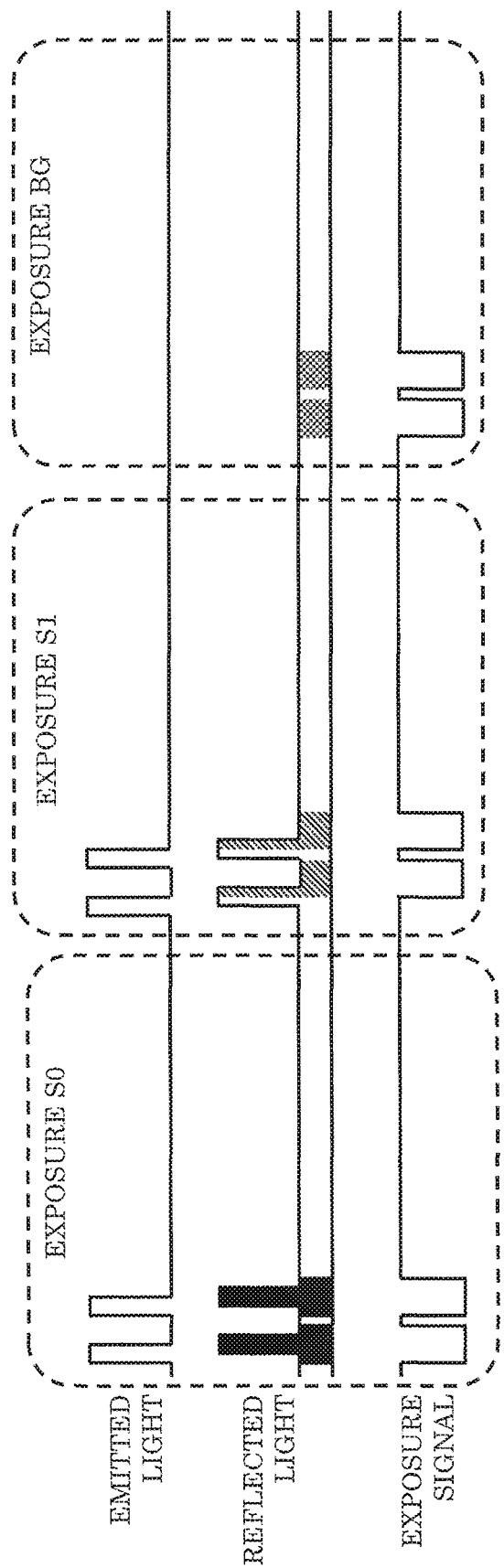
FIG. 6B is a diagram illustrating another example of the condition on measurement.

FIGS. 6A and 6B are diagrams illustrating examples of the condition on measurement. In the examples illustrated in FIGS. 6A and 6B, the repetition numbers of exposure operations in exposure S0 and exposure S1 described above are varied according to the condition. FIG. 6A illustrates a first condition having a first exposure interval. FIG. 6B illustrates a second condition having a second exposure interval. In other words, under the first condition in FIG. 6A, the exposure operation is repeated eight times in exposure S0 and exposure S1, respectively. Under the second condition in FIG. 6B, the exposure operation is repeated twice in exposure S0 and exposure S1, respectively, such that the ratio of the exposure amount in the first condition to that in the second condition is 4:1. A larger repetition number of exposure operations results in a larger amount of accumulated charge, enabling more precise calculation of the distance. However, when the accumulated charge amount exceeds the upper saturation limit, correct calculation cannot be carried out. In this embodiment, because the signal obtained on the first condition can have a charge amount four times that of the signal obtained on the second condition, the precision in the measurement of the distance is enhanced while the charge amount readily reaches the upper saturation limit.

In the examples of FIGS. 6A and 6B, the repetition number of exposure operations is varied according to the condition. The same effect is obtained through control of light source driver 102 by light emission timing signal SG1 to change the intensity of the light emitted from light source 104.

In the example illustrated in FIG. 5, drive controller 103 generates light emission timing signal SG1 and exposure timing signal SG2 for first region AR1 according to the first condition illustrated in FIG. 6A, for example, and generates light emission timing signal SG1 and exposure timing signal SG2 for second region AR2 according to the second condition illustrated in FIG. 6B, for example. As a result, the imaging in first region AR1 is performed on the first condition having a large repetition number of exposure operations whereas the imaging in second region AR2 is performed on the second condition having a small repetition number of exposure operations. Solid-state imaging element 105 continuously transfers the charges of pixels in units of frames to AFE 110, the pixels being obtained through the imaging performed on the two conditions.

Synthesizer 112 then generates the synthesized signal.

In the example illustrated in FIG. 5, synthesized pixel P1X is generated on the pixel (P1c) having a signal obtained on the first condition obtained from first region AR1. Synthesizer 112 needs line memory 111 to perform this arithmetic processing because synthesizer 112 uses four pixels P1a, P1b, P1d, and P1e surrounding pixel P1c and having signals obtained on the second condition.

When the synthesized pixel P1X is generated on pixel P1c exposed at the first exposure interval, its four surrounding pixels P1a, P1b, P1d, and P1e exposed at the second exposure interval are disposed to be vertically and horizontally symmetric about pixel P1c as the center of gravity.

For example, when no saturated pixel is present in the result obtained on the first condition having a large repetition number of exposure operations, using all the pixels, P1X is defined as follows $$P1X=(P1a+P1b+P1c+P1d+P1e)  \quad \text{(Expression 3)}$$

where each symbol represents the data of its corresponding pixel.

Such calculation can effectively use the result obtained on the second condition even if no saturated pixel is present. Thus, a larger amount of signals can be obtained than in the result obtained through exposure performed only on the first condition, resulting in an expanded dynamic range. Accordingly, the precision in the measurement of the distance can be enhanced.

In the pixels having saturated signal S0 or S1 under the first condition, the result obtained on the second condition having a small repetition number of exposure operations is used, and P1X is defined as follows:

$$P1X=(P1a+P1b+P1d+P1e) \times K \quad \text{(Expression 4)}$$

where coefficient K to be multiplied is determined from the ratio of the exposure amounts. In the examples illustrated in FIGS. 6A and 6B, coefficient K is "2".

Figure 7A:
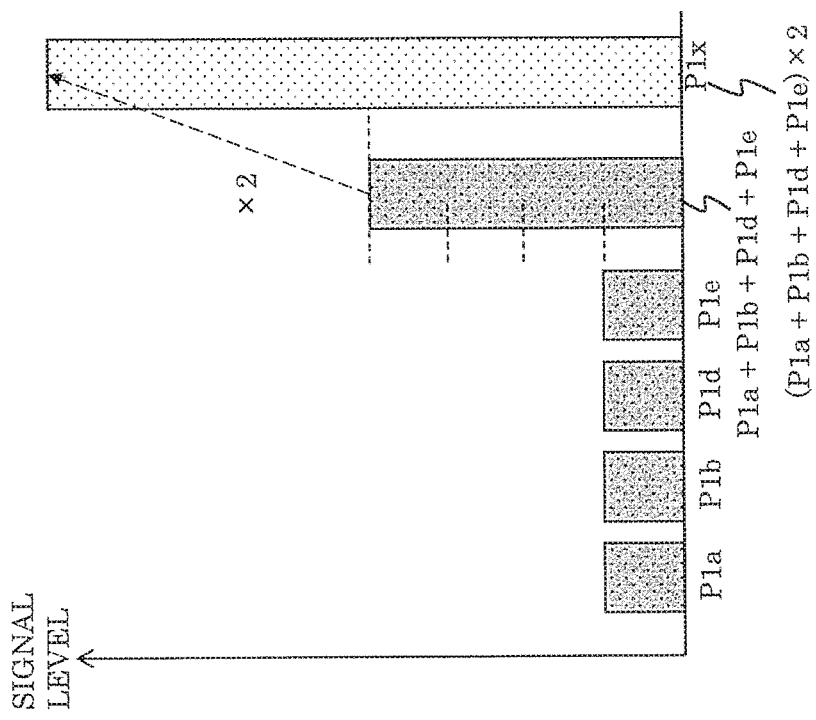
FIG. 7A is a diagram illustrating the signal level in synthesis arithmetic processing.
Figure 7B:
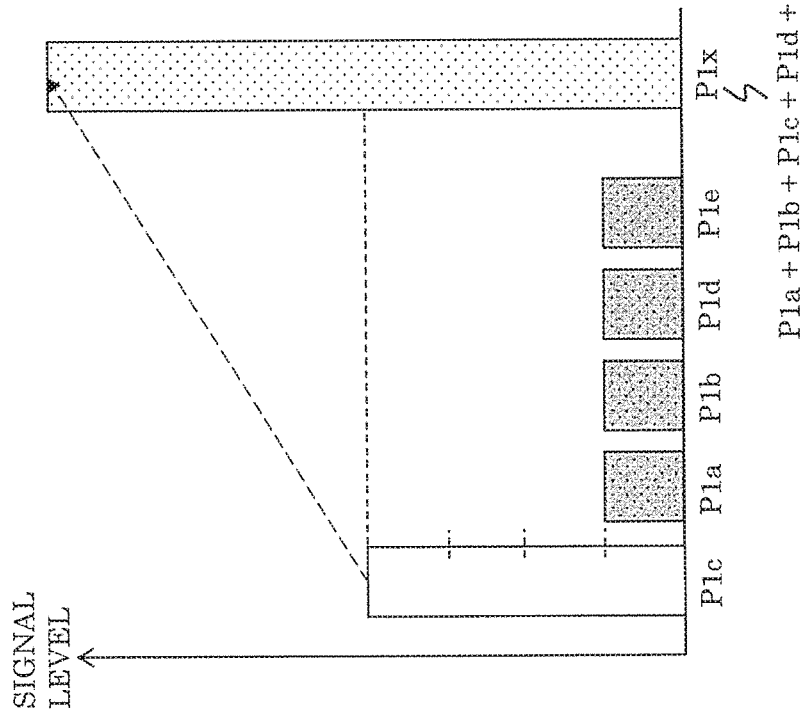
FIG. 7B is another diagram illustrating the signal level in synthesis arithmetic processing.

FIGS. 7A and 7B illustrate examples of the signal level changed by the above-described arithmetic processing when the condition on measurement is varied as illustrated in the examples of FIGS. 6A and 6B. In P1c having a signal obtained on the first condition, the signal level is four times that of each of the four pixels P1a, P1b, P1d, and P1e having signals obtained on the second condition. In FIG. 7A, all the pixels are added to generate synthesized pixel P1X having a signal level twice that of P1c. In FIG. 7B, four pixels P1a, P1b, P1d, and P1e having signals obtained on the second condition are added to generate a synthesized pixel having a signal level identical to the signal level of pixel P1c having a signal obtained on the first condition, and the resulting signal level is further doubled to generate synthesized pixel P1X having a signal level identical to that of synthesized pixel P1X in FIG. 7A.

As described above, when the signal level of synthesized pixel P1X is adjusted through multiplication by coefficient K, the signal of a pixel disposed near the pixel to be corrected can be used during correction of the signal in signal correction processor 113 at a rear stage. For example, standard noise reduction processing includes processing to perform spatial processing to reduce noises using a low-pass filter which determines high frequency components as noises and outputs only low frequency components, or a median filter. However, spatial processing cannot be performed when pixel units have different signal levels. Accordingly, by adjusting the signal level of synthesized pixel P1X as the output signal from synthesizer 112, noise components can be reduced through correction processing to be performed in signal correction processor 113, more significantly enhancing the precision in the measurement of the distance.

Figure 8B:
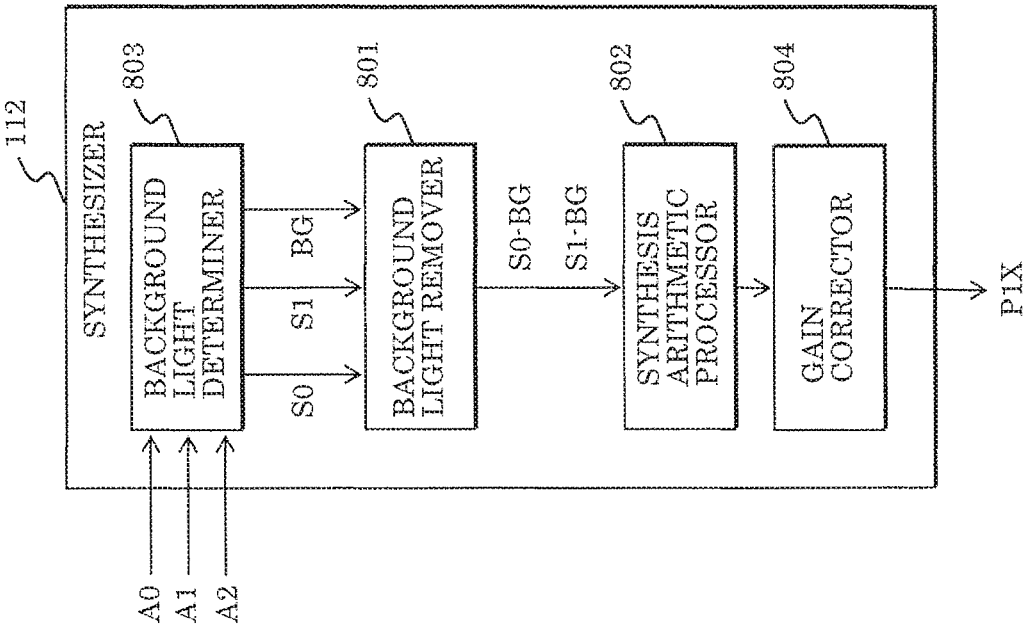
FIG. 8B is a diagram illustrating another configuration of the synthesizer.
Figure 8A:
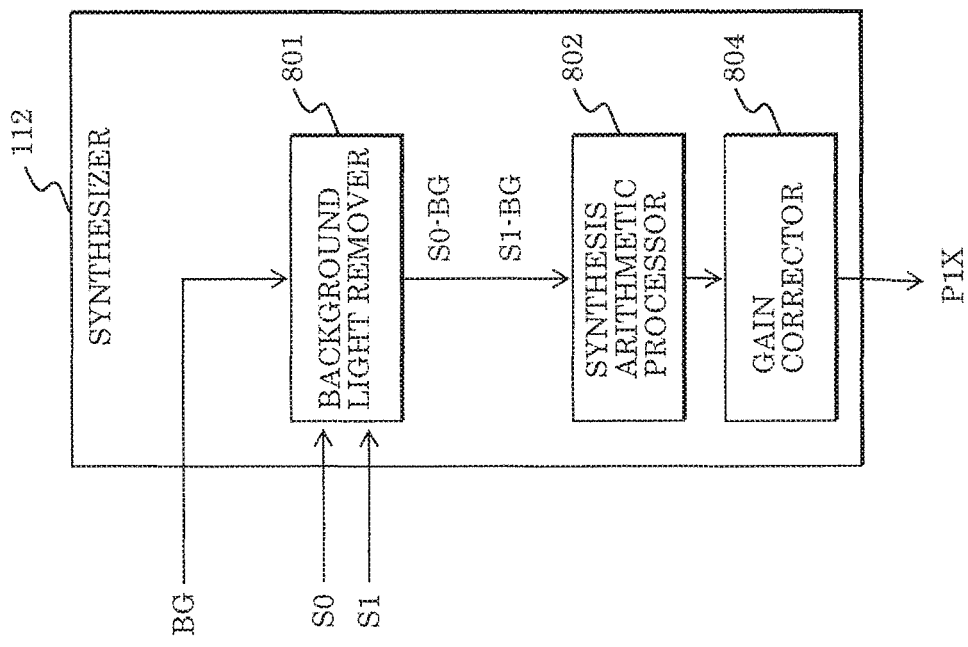
FIG. 8A is a diagram illustrating a configuration of a synthesizer.

FIGS. 8A and 8B are block diagrams illustrating configurations of synthesizer 112. Any background light, such as sunlight or light from a fluorescent lamp, is present under a normal environment. The background light is present in a certain proportion in the reflected light even if the condition on measurement is varied. For this reason, when the repetition number of exposure operations and the intensity of the light emitted from light source 104 are varied by changing the condition on measurement, the background light contained in the reflected light results in off-setting. Thus, the ratio of the signal obtained on the first condition to the signal obtained on the second condition is not identical to the ratio of the number of exposure operations. In other words, the synthesizing method described above cannot keep the linear properties of the signal obtained on the first condition and the signal obtained on the second condition, and thus cannot perform appropriate synthesis processing in synthesizer 112.

For this reason, as illustrated in FIG. 8A, synthesizer 112 includes background light remover 801 before the synthesis processing. In background light remover 801, background light BG is subtracted from the reflected light (S0 and S1) received in exposure S0 and exposure S1 to remove background light components contained in the reflected light, and the reflected light containing no background light components is input into synthesis arithmetic processor 802. Such a configuration provides a ratio of the signal obtained on the first condition to the signal obtained on the second condition identical to the ratio of the number of exposure operations, enabling appropriate synthesis processing by the synthesizing method described above. After both of the signal to be obtained on the first condition and the signal to be obtained on the second condition needed for synthesis are generated, synthesis arithmetic processor 802 performs the synthesis processing by the synthesizing method described above. During this processing, in the pixels having saturated signal S0 or S1 on the first condition, the information on necessity of gain correction is output to gain corrector 804, and the result of addition on the second condition is multiplied by coefficient K in gain corrector 804. Synthesized pixel P1X can thus be generated by the synthesizing method described above.

FIG. 8B is a diagram illustrating removal of the background light when the light is emitted from the light source even in exposure BG as illustrated in FIG. 4B. When the light is emitted from the light source even in exposure BG, it is unknown which pixels represent the background light among the pixels obtained at the exposure timings of exposure S0, exposure S1, and exposure BG. For this reason, as illustrated in FIG. 8B, background light determiner 803 determines at which exposure among exposure S0, exposure S1, and exposure BG, the reflected light (A0, A1, or A2) is received. Specifically, the signal levels of A0 and A2 are compared, and a pixel having a low signal level is determined as background light.

In such synthesis processing, the result obtained on the second condition through a small repetition number of exposure operations is used in pixels having saturated signal S0 or S1 and obtained on the first condition through a large repetition number of exposure operations, whereas the pixel signals obtained on the first condition and the second condition are both used in the remaining pixels. The results for all the pixels can be thereby obtained on their optimal conditions, enhancing the precision in the measurement of the distance.

Figure 2:
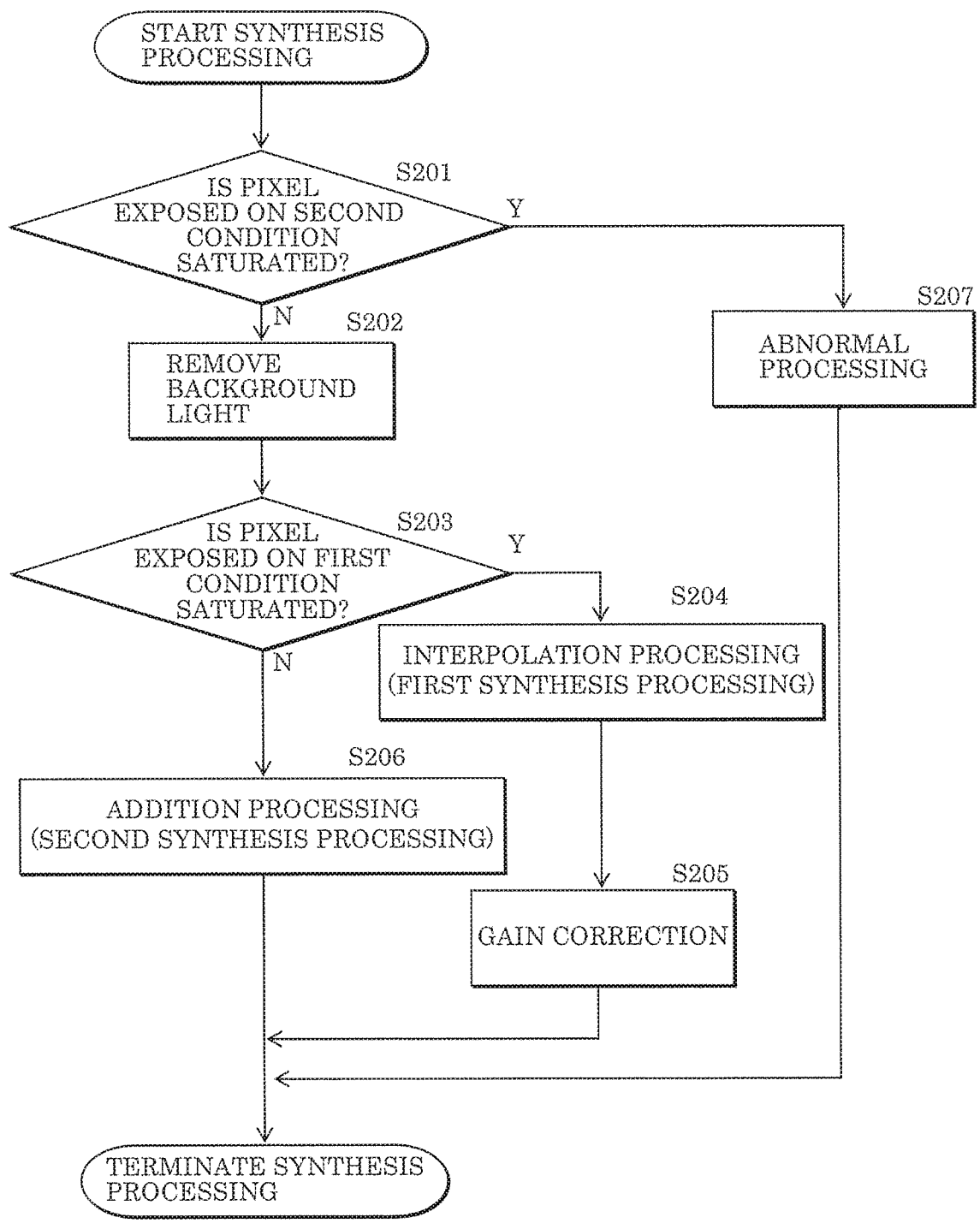
FIG. 2 is a flowchart of a synthesizing method.

FIG. 2 is a flowchart illustrating the distance image synthesizing method according to Embodiment 1.

First, in Step S201, it is determined whether the pixel signal exposed on the second condition is saturated or not. If the result of determination is NO in Step S201, the processing goes to Step S202 to perform at least one of the processings in Steps S202 to S206. If the result of determination is YES in Step S201, the processing goes to Step S207. In Step S207, because the pixel signals obtained on the first condition and the second condition are both saturated, synthesized pixel P1X is output as an abnormal value. Specifically, if the data "0" of synthesized pixel P1X is output in Step S207, the result of calculation of Expression (1), for example, in distance arithmetic operator 114, i.e., value of distance D0 is "0", which can be determined as an abnormal value. The output result from the abnormal processing in Step S207 can be any value other than "0" as long as the value can be determined in distance arithmetic operator 114.

As described above, in Step S202, background light BG is subtracted from the reflected light (S0 or S1) received during exposure S0 or S1 to remove background light components contained in the reflected light, and the ratio of the signal obtained on the first condition to the signal obtained on the second condition is equalized with the ratio of the repetition number of exposure operations.

In Step S203, it is determined whether the pixel signal of the pixel exposed on the first condition is saturated or not. In Step S203, if the result of determination is NO, the processing goes to Step S206 (second synthesis processing). If the result of determination is YES in Step S203, the processing goes to Step S204 (first synthesis processing).

In Step S206, addition is performed as the second synthesis processing. In other words, addition of a pixel having a signal obtained on the first condition to its surrounding four pixels having signals obtained on the second condition generates synthesized pixel P1X to terminate the synthesis processing.

In Step S204, interpolation processing is performed as the first synthesis processing. In other words, because signal S0 or S1 of the pixel exposed on the first condition is saturated, the interpolation processing is performed using signals S0 and S1 of the pixel exposed on the second condition. For example, if the pixel exposed on the first condition is saturated, four pixels surrounding the saturated pixel and exposed on the second condition are added to perform interpolation. After the interpolation processing is performed, the processing goes to Step S205. In Step S205, the result of addition of the pixels exposed on the second condition is multiplied by coefficient K to perform gain correction. From only the signals obtained on the second condition, this processing generates synthesized pixel P1X having the same signal level as that of synthesized pixel P1X to be generated in Step S206. After gain correction is performed in Step S205, the synthesis processing is terminated.

As described above, using all effective pixel information, the measurement of the distance can be performed across a substantially entire distance image irrespective of the distance to the target object or the surface reflectance of the target object. Furthermore, spatial processing such as noise reduction can be performed through adjustment of the signal level of synthesized pixel P1X, further enhancing the precision in the measurement of the distance.

As described above, the distance measuring device according to the present embodiment includes light emitter 10 which emits light L1 from light source 104 to target object OBJ, light receiver 20 which receives reflected light L2 in a group of pixels two-dimensionally disposed, the reflected light being generated through reflection of light L1 emitted from light emitter 10 on target object OBJ, synthesizer 112 which generates a synthesized signal by synthesizing a plurality of pixel signals read from pixels exposed at different exposure intervals among the group of pixels, and distance arithmetic operator 114 which calculates the value of distance to target object OBJ based on the synthesized signal and the difference in time between emission and reception of the light. Synthesizer 112 generates the synthesized signal by first synthesis processing when a pixel signal of the pixel exposed at a first exposure interval has a signal level higher than a predetermined saturation level, and generates the synthesized signal by second synthesis processing when the pixel signal of the pixel exposed at a first exposure interval has a signal level lower than the predetermined saturation level.

Here, in the first synthesis processing, the synthesizer may generate a synthesized signal using the pixel signal of the pixel exposed at a second exposure interval shorter than the first exposure interval among a plurality of pixel signals.

Here, in the second synthesis processing, the synthesizer may generate a synthesized signal by adding the pixel signal of the pixel exposed at the first exposure interval to the pixel signal of the pixel exposed at the second exposure interval among the plurality of pixel signals.

Here, in the first synthesis processing, the synthesizer may generate a synthesized signal through interpolation processing using the pixel signal of the pixel exposed at the second exposure interval, and the synthesized signal is expected to be obtained in the second synthesis processing when the signal level is lower than the predetermined saturation level.

Here, synthesizer 112 may include background light remover 801 which removes a pixel signal indicating the background light from a pixel signal indicating reflected light L2, and may generate a synthesized signal using the pixel signal indicating the reflected light after removal of the pixel signal indicating the background light.

Here, synthesizer 112 may include gain corrector 804 which performs gain correction on the synthesized signal obtained by the first synthesis processing based on a ratio of the exposure intervals such that a signal level of the synthesized signal obtained by the first synthesis processing is adjusted to that of the synthesized signal obtained by the second synthesis processing, and distance arithmetic operator 114 may calculate the value of distance to target object OBJ using the synthesized signal after gain correction.

Here, pre-synthesized pixels exposed at the first exposure interval and pre-synthesized pixels exposed at the second exposure interval may be disposed symmetrical about the center of gravity of post-synthesized pixels.

The distance image synthesizing method according to the present embodiment includes emitting light L1 from light source 104 to target object OBJ; receiving reflected light L2 in a group of pixels two-dimensionally disposed, the reflected light being generated through reflection of emitted light L1 on target object OBJ, generating a synthesized signal by synthesizing a plurality of pixel signals read from the pixels exposed at different exposure intervals among the group of pixels, and calculating the value of distance to target object OBJ based on the synthesized signal and the difference in time between emission and reception of the light. In the synthesizing, the synthesized signal is generated by first synthesis processing when the pixel signal of the pixel exposed at the first exposure interval has a signal level higher than a predetermined saturation level, and the synthesized signal is generated by second synthesis processing when the pixel signal of the pixel exposed at the first exposure interval has a signal level lower than the saturation level.

Embodiment 2

In Embodiment 2, another example of the distance measuring device described in Embodiment 1 will be described.

In the present embodiment, the condition on measurement of the pixel is switched for every frame to exchange two regions AR1 and AR2 in solid-state imaging element 105 in units of frames.

FIG. 9 is a diagram illustrating an arrangement pattern of two regions AR1 and AR2 in the present embodiment. The condition on measurement is switched between the current frame and the previous frame to exchange the lines of regions AR1 for those of regions AR2, and vice versa. In such an arrangement pattern of regions AR1 and AR2, the signal to be obtained on the first condition and the signal to be obtained on the second condition can be generated in the spatially same pixel position by using both of the pixels in the current frame and the previous frame. Such a pattern can prevent a reduction in resolution even if the pixels of solid-state imaging element 105 are divided into two regions AR1 and AR2. In other words, the resolution of the distance image generated from synthesized pixel P1X can be kept substantially identical to the resolution of the distance image generated from all the pixels of solid-state imaging element 105. The pixels can be divided into any number of regions having any size other than those in FIG. 9.

Figure 10:
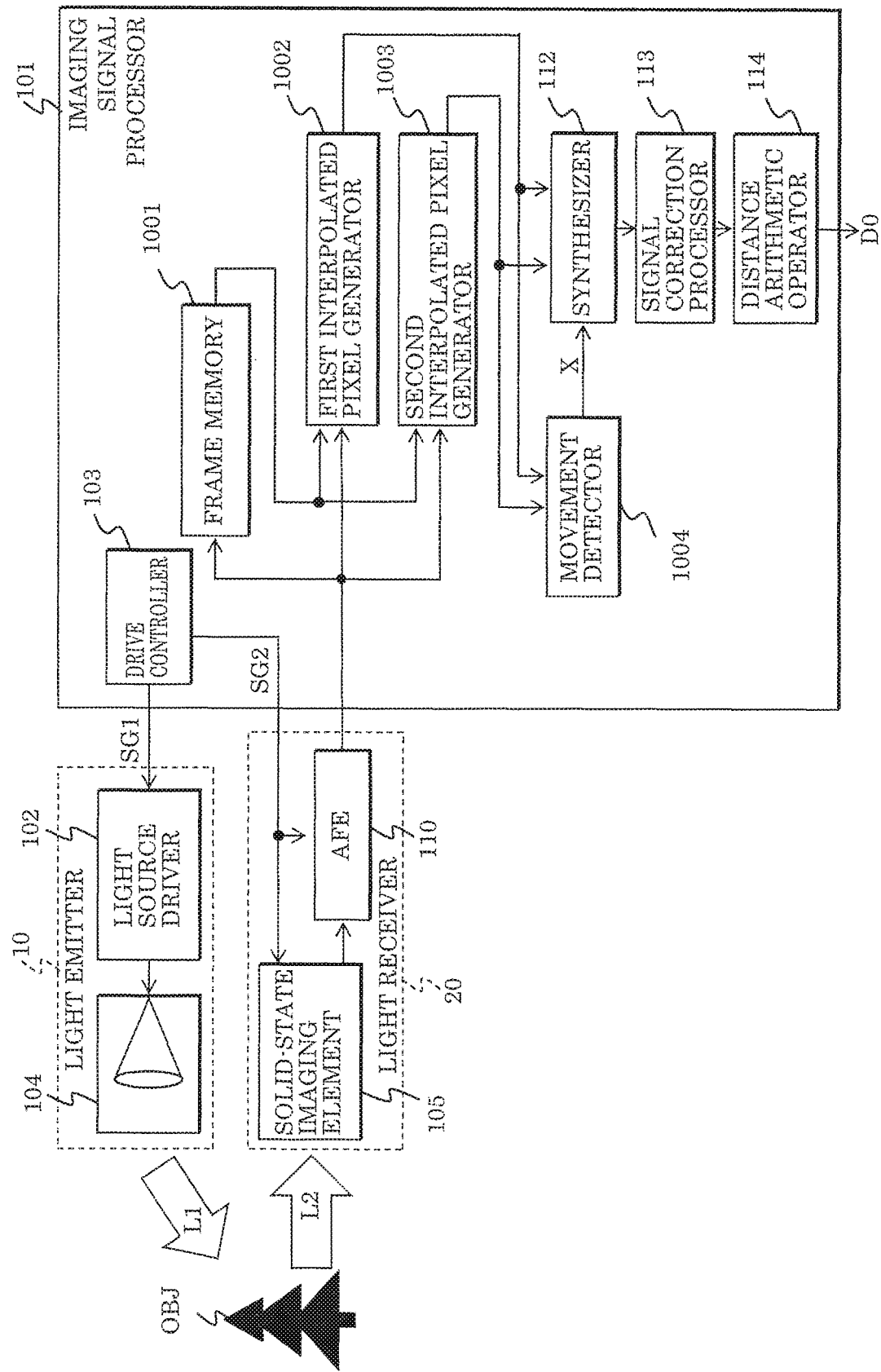
FIG. 10 is a diagram illustrating a configuration of the distance measuring device according to Embodiment 2.

FIG. 10 is a block diagram illustrating part of the configuration of the distance measuring device according to Embodiment 2. Unlike in FIG. 1, the distance measuring device illustrated in FIG. 10 further includes frame memory 1001, first interpolated pixel generator 1002, second interpolated pixel generator 1003, and movement detector 1004. These different components will be mainly described. Duplicated description of the configuration substantially identical to that of Embodiment 1 may be omitted in some cases.

In FIG. 10, an imaging signal input into imaging signal processor 101 in a first frame (previous frame) is once stored in frame memory 1001. In the next step, the imaging signal is read out from a second frame (current frame). At this time, two regions AR1 and AR2 in the first frame are replaced with each other in the second frame through switching of the condition on measurement of the pixels (see FIG. 9).

The captured image in the previous frame read out from frame memory 1001 and the captured image in the current frame are input into first interpolated pixel generator 1002 and second interpolated pixel generator 1003.

In first interpolated pixel generator 1002 and second interpolated pixel generator 1003, pixel signals are separated for each of regions AR1 and AR2. The separated pixel signals are two-dimensionally interpolated to generate the signals obtained on the first condition and the signals obtained on the second condition for all the pixels. As a result, four signals, i.e., the signal obtained on the first condition and the signal obtained on the second condition in the previous frame and the signal obtained on the first condition and the signal obtained on the second condition in the current frame are generated for all the pixels. The four signals are input into movement detector 1004 and synthesizer 112.

Figure 11:
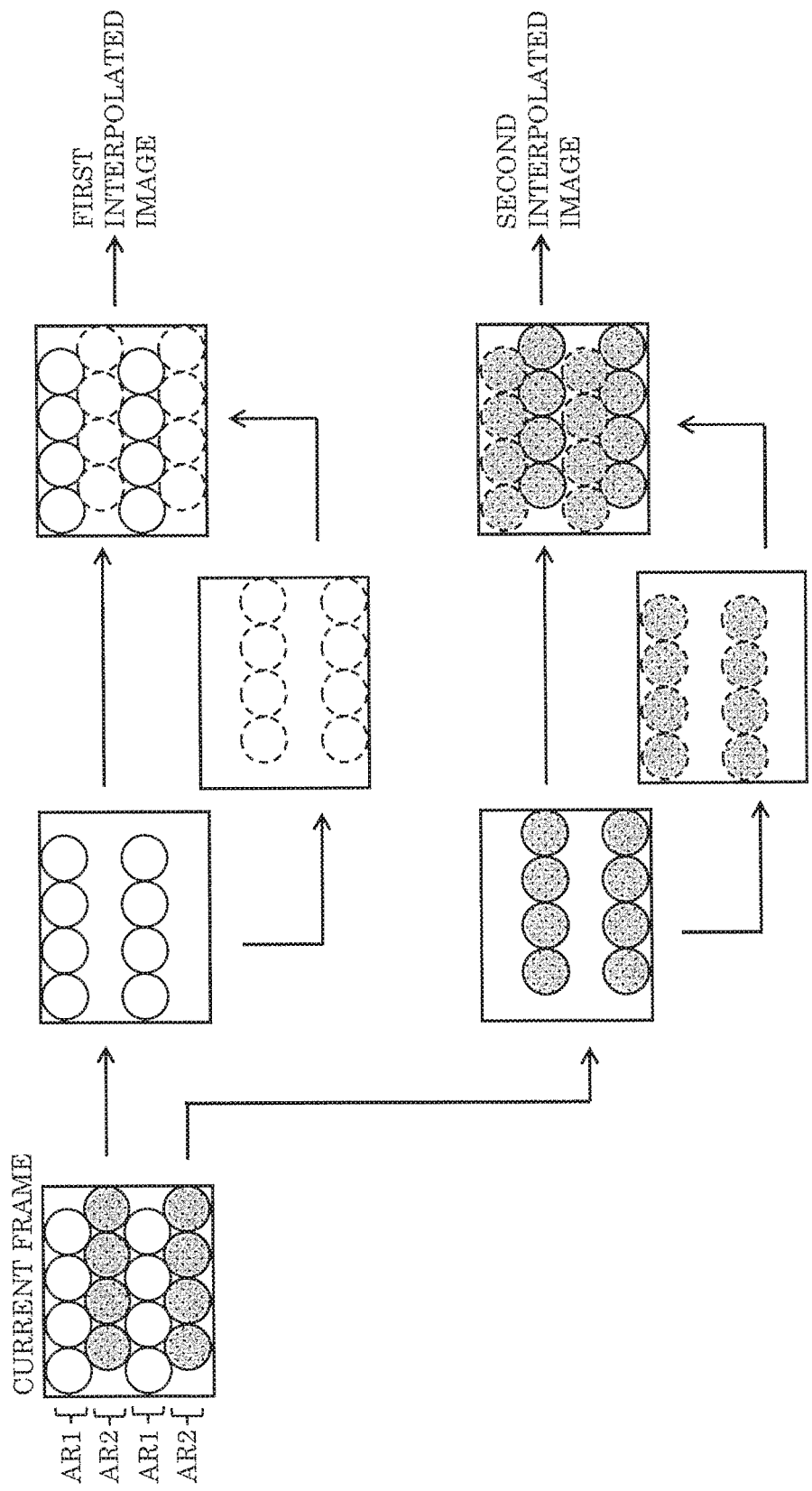
FIG. 11 is a diagram illustrating two-dimensional interpolation processing of the current frame.

FIG. 11 is a diagram illustrating interpolation processing of the current frame in first interpolated pixel generator 1002 and second interpolated pixel generator 1003. First, the imaging signals in the current frame are separated into first region AR1 in odd lines and second region AR2 in even lines. The signals obtained from first regions AR1 on the first condition are two-dimensionally interpolated by first interpolated pixel generator 1002 to generate the signals obtained on the first condition for all the pixels (first interpolated image). The signals obtained from second regions AR2 on the second condition are two-dimensionally interpolated by second interpolated pixel generator 1003 to generate signals obtained on the second condition for all the pixels (second interpolated image).

Figure 12:
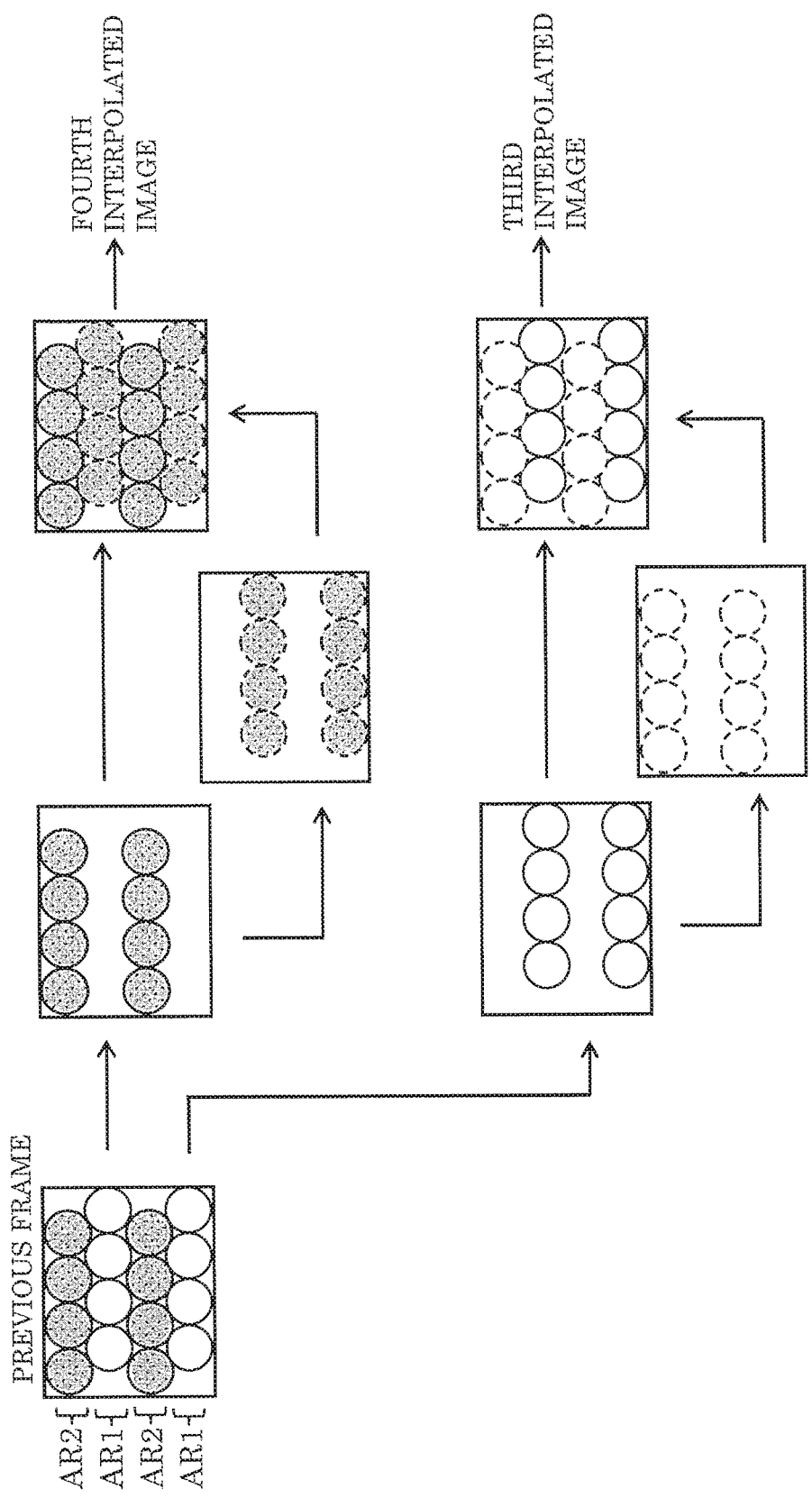
FIG. 12 is a diagram illustrating two-dimensional interpolation processing of the previous frame.
Figure 13:
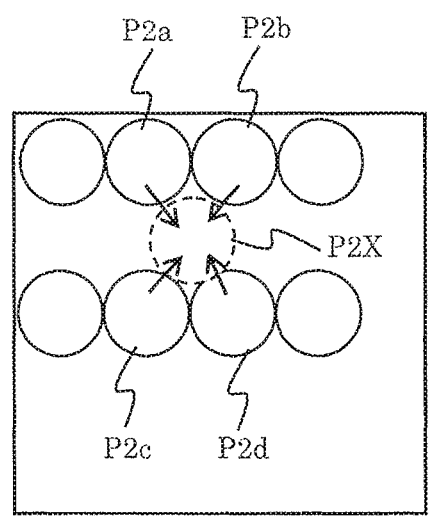
FIG. 13 is a diagram illustrating an example of two-dimensional interpolation processing.

In FIGS. 11 to 13, the pixels input from solid-state imaging element 105 to imaging signal processor 101 are represented by solid lines and the pixels generated through two-dimensional interpolation processing are represented by dotted lines.

FIG. 12 is a diagram illustrating interpolation processing of the previous frame in first interpolated pixel generator 1002 and second interpolated pixel generator 1003. First, the imaging signals in the previous frame are separated into second regions AR2 in odd lines and first regions AR1 in even lines. The signals obtained from first regions AR1 on the first condition are two-dimensionally interpolated by first interpolated pixel generator 1002 to generate the signals to be obtained on the first condition for all the pixels (third interpolated image). The signals obtained from second regions AR2 on the second condition are two-dimensionally interpolated by second interpolated pixel generator 1003 to generate the signals to be obtained on the second condition for all the pixels (fourth interpolated image).

Here, as illustrated in FIG. 13, for example, in the two-dimensional interpolation processing in first interpolated pixel generator 1002 and second interpolated pixel generator 1003, the pixel signals of pixels surrounding the pixel to be generated through the interpolation processing (interpolated pixel) are added and averaged to generate a pixel signal of the interpolated pixel. In other words, in FIG. 13, from the pixel signals of pixels (P2$a$, P2$b$, P2$c$, and P2$d$) surrounding the interpolated pixel, pixel signal P2X of the interpolated pixel is defined:

$$P2X=(P2a+P2b+P2c+P2d)/4 \qquad \text{(Expression 5)}$$

where each symbol represents the data of its corresponding pixel. Any other expression to generate the interpolated pixel can be used.

In response to input of four signals, i.e., the signal obtained on the first condition and the signal obtained on the second condition in the previous frame, and the signal obtained on the first condition and the signal obtained on the second condition in the current frame, movement detector 1004 compares the pixels located in the same spatial positions between the first interpolated image generated from the signals obtained on the first condition in the current frame and the third interpolated image generated from the signals obtained on the first condition in the previous frame to detect movement amount X between the frames for each pixel. Movement amount X is defined, for example, as a difference in signal level between the pixels located in the same spatial position. At this time, in the pixels having signal S0 or S1 saturated under the first condition, movement amount X between the frames is detected for each pixel using the signal obtained on the second condition through comparison of the pixels located in the same spatial positions between the second interpolated image generated from the signals obtained on the second condition in the current frame and the fourth interpolated image generated from the signals obtained on the second condition in the previous frame. The detected movement amount X is input into synthesizer 112.

Figure 14:
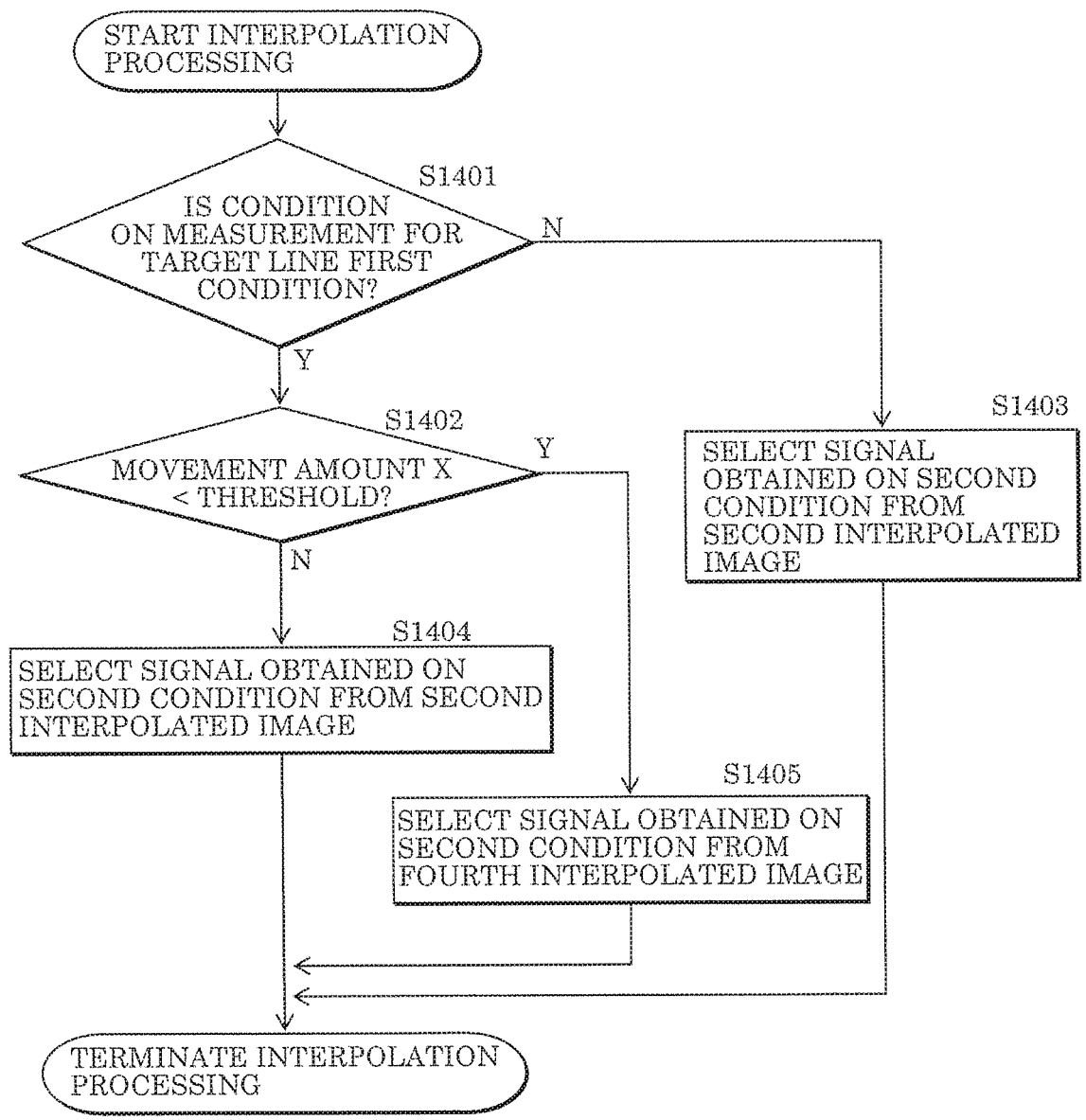
FIG. 14 is a flowchart illustrating of the interpolation processing in synthesizer 112 according to Embodiment 2.

FIG. 14 is a flowchart illustrating the interpolation processing (Step S204 in FIG. 2) in synthesizer 112 according to Embodiment 2.

First, in Step S1401, it is determined whether the condition on measurement for the target line is the first condition or not. If the result of determination is NO, the processing goes to Step S1403. In Step S1403, because the condition on measurement for the target line is the second condition, pixels are selected from the second interpolated image generated from the signals of the current frame, and the interpolation processing is terminated. If the result of determination is YES in Step S1401, the processing goes to Step S1402 to perform at least one of processings from Steps S1402 to S1405. In Step S1402, it is determined whether movement amount X input from movement detector 1004 is smaller than a predetermined threshold or not. If the result of determination is YES, the processing goes to Step S1405. In Step S1405, it is determined from the result of determination in Step S1402 that the pixels have a small amount of movement or change in the target object, and the fourth interpolated image is selected as the signals obtained on the second condition. The pixel signal is then output from the pixel located in the same spatial position in the previous frame, and the interpolation processing is terminated. If the result of determination is NO in Step S1402, the processing goes to Step S1404. In Step S1404, it is determined from the result of determination in Step S1402 that the pixels have a movement caused by a change in position of the target object, for example, and the second interpolated image is selected as the signals obtained on the second condition. Thereby, in the pixels having a movement, the pixel signals generated from the signals obtained on the second condition in the current frame are output without using the pixel signals in the previous frame, and the interpolation processing is terminated.

Figure 15:
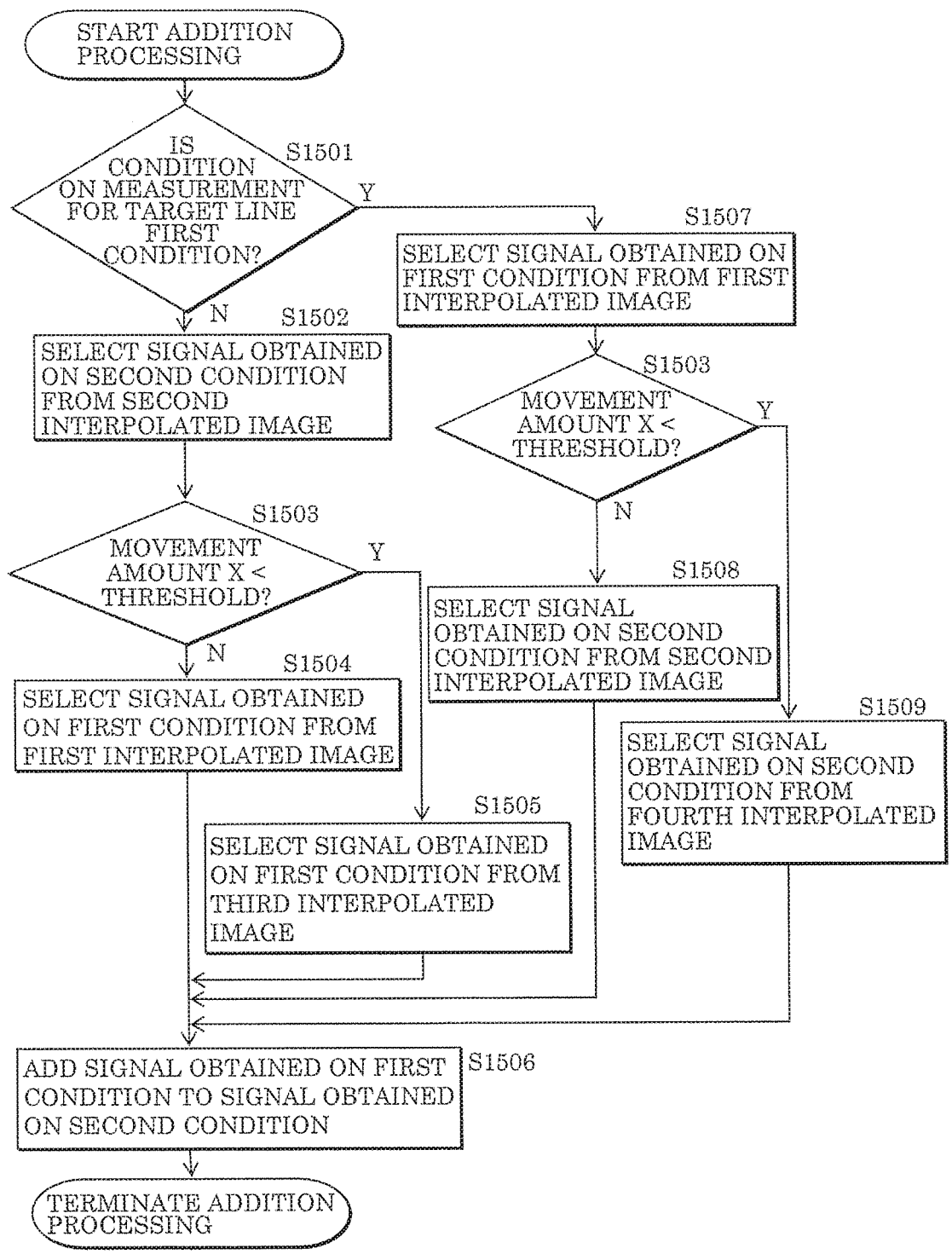
FIG. 15 is a flowchart illustrating the addition processing in synthesizer 112 according to Embodiment 2.

FIG. 15 is a flowchart illustrating an addition processing (Step S206 in FIG. 2) in synthesizer 112 according to Embodiment 2.

First, in Step S1501, it is determined whether the condition on measurement for the target line is the first condition or not. If the result of determination is NO, the processing goes to Step S1502 to perform at least one of processings from Steps S1502 to S1505. In Step S1502, because the condition on measurement for the target line is the second condition, pixels are selected from the second interpolated image generated from the signals of the current frame. The processing goes to Step S1503. In Step S1503, it is determined whether movement amount X input from movement detector 1004 is smaller than a predetermined threshold or not. If the result of determination is YES, the processing goes to Step S1505. In Step S1505, it is determined from the result of determination in Step S1503 that the pixels indicate a static state having a small amount of movement or change in the target object. The third interpolated image is selected as the signals obtained on the first condition. The processing then goes to Step S1506. In Step S1506, the signals obtained on the second condition in the current frame selected in Step S1502 are added to the signals obtained on the first condition in the previous frame selected in Step S1505. The addition processing is then terminated. If the result of determination is NO in Step S1503, the processing goes to Step S1504. In Step S1504, it is determined from the result of determination in Step S1503 that the pixels indicate a dynamic state of the target object or a movement caused by a change in position of the target object, for example. The first interpolated image is selected as the signals obtained on the first condition, and the processing goes to Step S1506. In Step S1506, the signals obtained on the second condition in the current frame selected in Step S1502 are added to the signals obtained on the first condition in the current frame selected in Step S1504. The addition processing is then terminated.

If the result of determination is YES in Step S1501, the processing goes to Step S1507 to perform at least one of processings from Steps S1507 to S1509. In Step S1507, because the condition on measurement for the target line is the first condition, pixels are selected from the first interpolated image generated from the signals in the current frame. The processing goes to Step S1503. In Step S1503, it is determined whether movement amount X input from movement detector 1004 is smaller than a predetermined threshold or not. If the result of determination is YES, the processing goes to Step S1509. In Step S1509, it is determined from the result of determination in Step S1503 that the pixels have a small amount of movement or a small amount of change in the target object, and the fourth interpolated image is selected as the signals obtained on the second condition. The processing goes to Step S1506. In Step S1506, the signals obtained on the first condition in the current frame selected in Step S1507 are added to the signals obtained on the second condition in the previous frame selected in Step S1509, and the addition processing is terminated. If the result of determination is NO in Step S1503, the processing goes to Step S1508. In Step S1508, it is determined from the result of determination in Step S1503 that the pixels have a movement caused by a change in position of the target object, for example, and the second interpolated image is selected as the signals obtained on the second condition. The processing goes to Step S1506. In Step S1506, the signals obtained on the first condition in the current frame selected in Step S1507 are added to the signals obtained on the second condition in the current frame selected in Step S1508. The addition processing is then terminated.

Such determination of the presence/absence of the movement of the target object based on movement amount X output from movement detector 1004 enables switching between use of the pixels in the current frame and use of the pixels in the previous frame according to the movement of the target object, reducing blur or residual images generated in the distance image.

Figure 16:
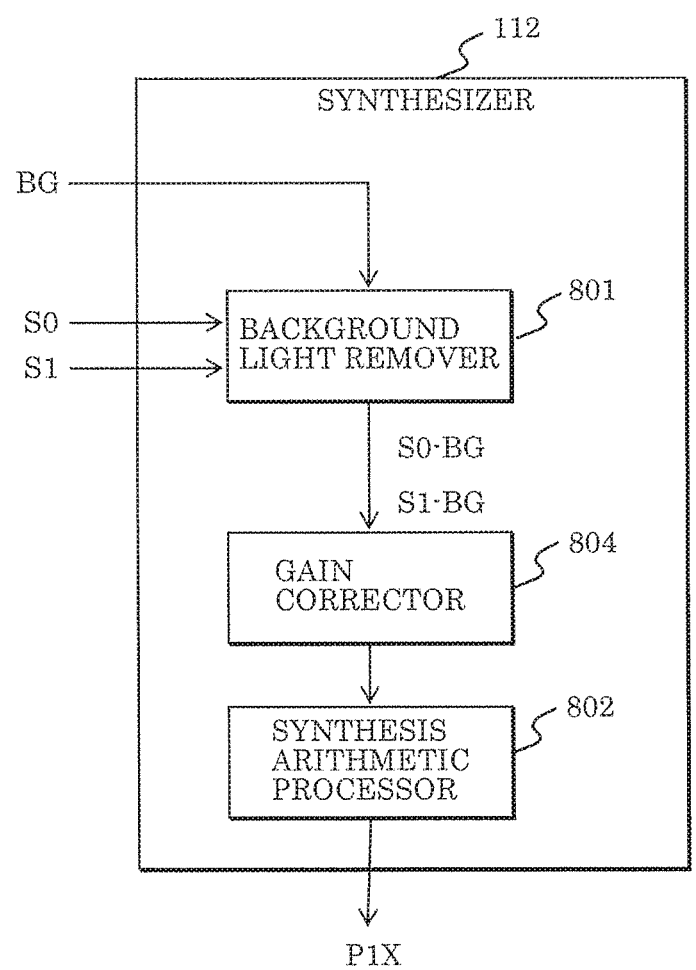
FIG. 16 is a diagram illustrating an exemplary configuration of synthesizer 112 according to Embodiment 2.

FIG. 16 is a block diagram illustrating one example of a configuration of synthesizer 112 according to Embodiment 2. Unlike the configuration in FIG. 8A, gain corrector 804 is disposed before synthesis arithmetic processor 802. Prior to input of the signal into synthesis arithmetic processor 802, the signal level of pixel Pl having a signal obtained on the first condition is equalized with that of pixel Ps having a signal obtained on the second condition. If no saturated pixel is present also in the result obtained on the first condition, the average of the signal level of pixel Pl and that of pixel Ps having a signal level equalized with that of pixel Pl is calculated to generate synthesized pixel P1X.

$$P1X=(Pl+Ps\times K)/2 \qquad \text{(Expression 6)}$$

where each symbol represents the data of its corresponding pixel. In the pixels having saturated signal S0 or S1 obtained on the first condition, synthesized pixel P1X is generated only from the signals obtained on the second condition.

$$P1X=Ps\times K \qquad \text{(Expression 7)}$$

where coefficient K to be multiplied is determined from the ratio of the exposure amounts, and is "4".

Figure 17A:
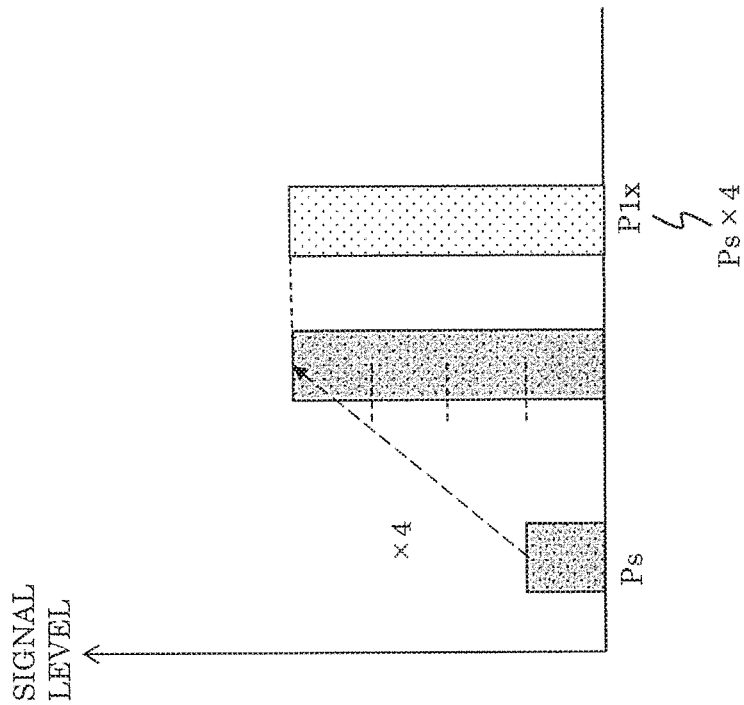
FIG. 17A is a diagram illustrating a change in signal level by the synthesis arithmetic processing according to Embodiment 2.
Figure 17B:
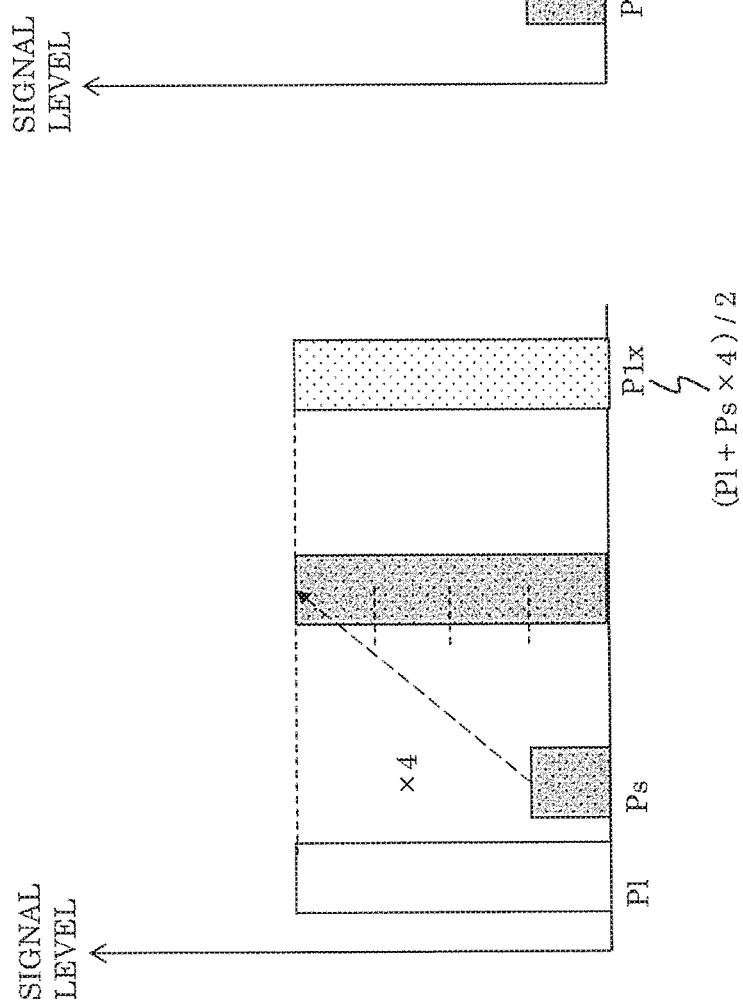
FIG. 17B is a diagram illustrating a change in signal level by the synthesis arithmetic processing according to Embodiment 2.

FIGS. 17A and 17B are diagrams illustrating examples of a change in signal level according to Embodiment 2. For example, pixel Pl having a signal obtained on the first condition has a signal level four times higher than that of pixel Ps having a signal obtained on the second condition. If no saturated pixel is present also in the result obtained on the first condition, as illustrated in FIG. 17A, synthesized pixel P1X has a signal level corresponding to the average of the signal level of pixel Pl and that of pixel Ps having a signal level equalized with that of pixel Pl. In the pixels having saturated signal S0 or S1 on the first condition, as illustrated in FIG. 17B, synthesized pixel P1X is generated only from the signals obtained on the second condition.

As described above, when the signal level of synthesized pixel P1X is adjusted through multiplication by coefficient K, signal correction processor 113 can perform spatial processing. Accordingly, noise components can be reduced by correction processing performed in signal correction processor 113, further enhancing the precision in the measurement of the distance.

Such a configuration can reduce blur of the target object or generation of residual images, and enables the measurement of the distance across the substantially entire distance image irrespective of the distance to the target object or the surface reflectance of the target object while the resolution of all the pixels of solid-state imaging element 105 is ensured.

In the distance measuring device according to the present embodiment described above, the group of pixels outputs first pixel signals read from the pixels in a first line which are exposed at the first exposure interval and second pixel signals read from the pixels in a second line different from the first line which are exposed at the second exposure interval. The first line and the second line are alternately disposed in one frame.

Here, the group of pixels may be disposed such that the pixels in the first line are shifted in the horizontal direction from the pixel in the second line by a half of a pixel.

Here, the ratio of the first exposure interval to the second exposure interval may be 4:1.

Here, light receiver 20 may alternately generate a frame having the first line as a leading line and a frame having the second line as a leading line.

Here, the distance measuring device according to the present embodiment may further include frame memory 1001 which records all the pixel signals in one frame obtained in light receiver 20, movement detector 1004 which detects a movement of target object OBJ, first interpolated pixel generator 1002 which generates first pixel signals for all the pixels from the first pixel signals read from the pixels in the first line, and second interpolated pixel generator 1003 which generates second pixel signals for all the pixels from the second pixel signals read from the pixels in the second line. In the second synthesis processing, synthesizer 112 may synthesize a pixel signal of a current pixel with a pixel signal of a co-located pixel in an immediately preceding frame when movement detector 1004 determines that target object OBJ is in a static state, and may synthesize the first pixel signal generated by first interpolated pixel generator 1002 with the second pixel signal generated by second interpolated pixel generator 1003 when movement detector 1004 determines that target object OBJ is in a dynamic state.

Here, from pixel signals obtained in light receiver 20, a first interpolated image composed of the first pixel signal may be generated by first interpolated pixel generator 1002, and a second interpolated image composed of the second pixel signal may be generated by second interpolated pixel generator 1003; from the pixel signals obtained in the immediately preceding frame recorded by frame memory 1001, a third interpolated image composed of the first pixel signal may be generated by first interpolated pixel generator 1002, and a fourth interpolated image composed of the second pixel signal may be generated by second interpolated pixel generator 1003; movement detector 1004 may compare the first interpolated image to the third interpolated image and the second interpolated image to the fourth interpolated image to detect a movement of target object OBJ; in the first synthesis processing, synthesizer 112 may generate a synthesized signal using the fourth interpolated image when the movement is smaller than a threshold, and may generate a synthesized signal using the second interpolated image when the movement is not smaller than the threshold.

Although only some exemplary embodiments have been described above, these embodiments will not limit the scope of claims of this application. Those skilled in the art will readily understand that without materially departing from novel teachings and advantages of the subjects described in the attached Claims, these embodiments may be modified in various ways, and the components in these embodiments may be arbitrarily combined into other embodiments. Accordingly, such modifications and other embodiments are also intended to be included in the scope of the present disclosure.

INDUSTRIAL APPLICABILITY

The present disclosure is useful for expansion of the range of the distance to be measured by distance measuring devices of measuring the distance to the target object or the shape of the target object and an enhancement in precision of the measurement of the distance, and can be used in input devices of performing input with gestures through detection of fingers of a person, for example.

What is claimed is:

1. A distance measuring device, comprising:
  a light emitter which emits light from a light source to a target object;
  a light receiver which receives reflected light in a group of pixels two-dimensionally disposed, the reflected light being generated through reflection of the light emitted from the light emitter on the target object;
  a synthesizer which generates a synthesized signal by synthesizing a plurality of pixel signals read from pixels exposed at different exposure intervals among the group of pixels;
  a distance arithmetic operator which calculates a value of distance to the target object based on the synthesized signal and a difference in time between emission and reception of the light; and
  a movement detector which detects a movement of the target object,
  wherein the synthesizer generates the synthesized signal by first synthesis processing when a pixel signal of a pixel exposed at a first exposure interval has a signal level higher than a predetermined saturation level, and generates the synthesized signal by second synthesis processing when the pixel signal of the pixel exposed at the first exposure interval has a signal level lower than the predetermined saturation level, and
  in the first synthesis processing and the second synthesis processing, the synthesizer generates the synthesized signal using the pixels in the previous frame when the movement is smaller than a threshold, and generates the synthesized signal using the pixels in the current frame when the movement is not smaller than the threshold.

2. The distance measuring device according to claim 1, wherein in the first synthesis processing, the synthesizer generates the synthesized signal using a pixel signal of a pixel exposed at a second exposure interval shorter than the first exposure interval among the plurality of pixel signals.

3. The distance measuring device according to claim 2, wherein in the second synthesis processing, the synthesizer generates the synthesized signal by adding the pixel signal of the pixel exposed at the first exposure interval to the pixel signal of the pixel exposed at the second exposure interval among the plurality of pixel signals.

4. The distance measuring device according to claim 3, wherein in the first synthesis processing, the synthesizer generates a synthesized signal through interpolation processing using the pixel signal of the pixel exposed at the second exposure interval, and the synthesized signal is expected to be obtained in the second synthesis processing when the signal level is lower than the predetermined saturation level.

5. The distance measuring device according to claim 2, wherein pre-synthesized pixels exposed at the first exposure interval and pre-synthesized pixels exposed at the second exposure interval are disposed symmetrical about a center of gravity of post-synthesized pixels.

6. The distance measuring device according to claim 5, wherein the group of pixels outputs first pixel signals read from pixels in a first line which are exposed at the first exposure interval and second pixel signals read from pixels in a second line different from the first line which are exposed at the second exposure interval, and the first line and the second line are alternately disposed in one frame.

7. The distance measuring device according to claim 6, wherein the group of pixels is disposed such that the pixels in the first line are shifted in a horizontal direction from the pixels in the second line by a half of a pixel.

8. The distance measuring device according to claim 7, wherein a ratio of the first exposure interval to the second exposure interval is 4:1.

9. The distance measuring device according to claim 6, wherein the light receiver alternately generates a frame having the first line as a leading line and a frame having the second line as a leading line.

10. The distance measuring device according to claim 1, wherein the synthesizer includes a background light remover which removes a pixel signal indicating background light from a pixel signal indicating the reflected light, and generates the synthesized signal using a pixel signal indicating the reflected light after removal of the pixel signal indicating the background light.

11. The distance measuring device according to claim 10, wherein the synthesizer includes a gain corrector which performs gain correction on the synthesized signal obtained by the first synthesis processing based on a ratio of the exposure intervals such that a signal level of the synthesized signal obtained by the first synthesis processing is adjusted to a signal level of the synthesized signal obtained by the second synthesis processing, and the distance arithmetic operator calculates the value of distance using the synthesized signal after gain correction.

12. A distance measuring device, comprising:
a light emitter which emits light from a light source to a target object;
a light receiver which receives reflected light in a group of pixels two-dimensionally disposed, the reflected light being generated through reflection of the light emitted from the light emitter on the target object;
a synthesizer which generates a synthesized signal by synthesizing a plurality of pixel signals read from pixels exposed at different exposure intervals among the group of pixels;
a distance arithmetic operator which calculates a value of distance to the target object based on the synthesized signal and a difference in time between emission and reception of the light;
a frame memory which records all of the pixel signals in an immediately preceding frame obtained in the light receiver;
a movement detector which detects a movement of the target object;
a first interpolated pixel generator which generates first pixel signals for all the pixels from the first pixel signals; and
a second interpolated pixel generator which generates second pixel signals for all the pixels from the second pixel signals,
wherein the synthesizer generates the synthesized signal by first synthesis processing when a pixel signal of a pixel exposed at a first exposure interval has a signal level higher than a predetermined saturation level, and generates the synthesized signal by second synthesis processing when the pixel signal of the pixel exposed at the first exposure interval has a signal level lower than the predetermined saturation level,
pre-synthesized pixels exposed at the first exposure interval and pre-synthesized pixels exposed at the second exposure interval are disposed symmetrical about a center of gravity of post-synthesized pixels,
the group of pixels outputs first pixel signals read from pixels in a first line which are exposed at the first exposure interval and second pixel signals read from pixels in a second line different from the first line which are exposed at the second exposure interval,
the first line and the second line are alternately disposed in one frame,
and the light receiver alternately generates a frame having the first line as a leading line and a frame having the second line as a leading line, and
in the second synthesis processing, the synthesizer synthesizes a pixel signal of a current pixel with a pixel signal of a co-located pixel in an immediately preceding frame when the movement detector determines that the target object is in a static state, and synthesizes the first pixel signal generated by the first interpolated pixel generator with the second pixel signal generated by the second interpolated pixel generator when the movement detector determines that the target object is in a dynamic state.

13. The distance measuring device according to claim 12, wherein from the pixel signals obtained in the light receiver, a first interpolated image composed of the first pixel signal is generated by the first interpolated pixel generator, and a second interpolated image composed of the second pixel signal is generated by the second interpolated pixel generator,
from the pixel signals obtained in the immediately preceding frame recorded in the frame memory, a third interpolated image composed of the first pixel signal is generated by the first interpolated pixel generator, and a fourth interpolated image composed of the second pixel signal is generated by the second interpolated pixel generator, the movement detector compares the first interpolated image to the third interpolated image and the second interpolated image to the fourth interpolated image to detect a movement of the target object, and in the first synthesis processing, the synthesizer generates the synthesized signal by the first synthesis processing using the fourth interpolated image when the movement is smaller than a threshold, and generates the synthesized signal by the first synthesis processing using the second interpolated image when the movement is not smaller than the threshold.

\* \* \* \* \*